(12) United States Patent
Kono et al.

(10) Patent No.: US 8,145,930 B2
(45) Date of Patent: Mar. 27, 2012

(54) STORAGE SYSTEM AND MANAGEMENT INFORMATION ACQUISITION METHOD FOR POWER SAVING

(75) Inventors: Yasutaka Kono, Yokohama (JP); Daisuke Shinohara, Yokohama (JP); Yuri Hiraiwa, Sagamihara (JP); Nobuyuki Osaki, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 963 days.

(21) Appl. No.: 11/968,290

(22) Filed: Jan. 2, 2008

(65) Prior Publication Data
US 2008/0229131 A1 Sep. 18, 2008

(30) Foreign Application Priority Data
Mar. 12, 2007 (JP) ................................. 2007-062283

(51) Int. Cl.
*G06F 13/12* (2006.01)
*G06F 1/00* (2006.01)
*G06F 11/00* (2006.01)
(52) U.S. Cl. ............. 713/323; 710/74; 713/300; 714/48
(58) Field of Classification Search .................. 713/323, 713/300; 710/74; 714/48
See application file for complete search history.

(56) References Cited

U.S. PATENT DOCUMENTS

| | | | | |
|---|---|---|---|---|
| 5,666,538 A * | 9/1997 | DeNicola | ....................... | 713/320 |
| 6,513,124 B1 * | 1/2003 | Furuichi et al. | ................ | 713/322 |
| 7,178,043 B2 * | 2/2007 | Nakazato | ...................... | 713/300 |
| 7,325,050 B2 * | 1/2008 | O'Connor et al. | ............. | 709/223 |
| 7,434,090 B2 * | 10/2008 | Hartung et al. | ..................... | 714/6 |
| 7,523,236 B1 * | 4/2009 | Nemazie et al. | ................. | 710/74 |
| 7,580,312 B2 * | 8/2009 | Rajan et al. | ..................... | 365/227 |
| 7,584,368 B2 * | 9/2009 | Nichols et al. | ................. | 713/300 |
| 7,661,005 B2 * | 2/2010 | Spengler et al. | .............. | 713/330 |
| 7,664,968 B2 * | 2/2010 | Bahali et al. | ................... | 713/300 |
| 7,721,125 B2 * | 5/2010 | Fung | .............................. | 713/320 |
| 2003/0055969 A1 * | 3/2003 | Begun et al. | ................... | 709/226 |
| 2005/0111249 A1 | 5/2005 | Yagisawa et al. | | |
| 2006/0282686 A1 * | 12/2006 | Bahali et al. | ................... | 713/300 |
| 2007/0006001 A1 * | 1/2007 | Isobe et al. | ...................... | 713/300 |
| 2007/0260896 A1 * | 11/2007 | Brundridge et al. | .......... | 713/300 |

FOREIGN PATENT DOCUMENTS
JP 2005-157710 6/2005

* cited by examiner

*Primary Examiner* — Paul R Myers
*Assistant Examiner* — Christopher a Daley
(74) *Attorney, Agent, or Firm* — Antonelli, Terry, Stout & Kraus, LLP.

(57) ABSTRACT

The object of the invention is to control the power consumption in a storage subsystem. In a storage system, when a monitor in a host computer acquires information concerning a storage region to manage the storage region, a monitor in the host computer checks whether or not the power supply state in the storage region is 'on' based on a storage region information that stores first information indicating whether or not the power supply state in the storage region is 'on' and second information concerning the storage region, and acquires the second information from the storage region information table if the power supply state in the storage region is not 'on'.

24 Claims, 31 Drawing Sheets

FIG.2

| LUN | MOUNT POINT | POWER SUPPLY STATE | FILE SYSTEM USAGE RATE [%] | LAST ACCESS TIME | MANAGEMENT COMPUTER IP ADDRESS |
|---|---|---|---|---|---|
| 0 | /dev/sd0 | 1 | 30 | 2006/11/10/16:12:30 | 192.168.0.10 |
| 1 | /dev/sd1 | 0 | 20 | 2006/12/02/10:50:10 | 192.168.0.10 |

(1220, 1221, 1222, 1223, 1224, 1225; table 122)

FIG.3

| HOST WWN | SUBSYSTEM ID | LUN | DISK ID | PARTITION NUMBER | SUBSYSTEM IP ADDRESS | HOST IP ADDRESS |
|---|---|---|---|---|---|---|
| 10:00:34... | USP.149 | 0 | 0, 1, 2, 3 | - | 172.16.100.1 | 192.168.0.20 |
| 10:00:34... | USP.149 | 1 | 4 | - | 172.16.100.1 | 192.168.0.20 |
| 10:00:4E... | USP.149 | 2 | 5 | 0 | 172.16.100.1 | 192.168.0.21 |
| 10:00:4E... | USP.149 | 3 | 5 | 1 | 172.16.100.1 | 192.168.0.21 |

(2220, 2221, 2222, 2223, 2224, 2225, 2226; table 222)

FIG.4

| LUN | DISK ID | PARTITION NUMBER | POWER SUPPLY CONTROL FLAG |
|---|---|---|---|
| 0 | 0, 1, 2, 3 | - | - |
| 1 | 4 | - | - |
| 2 | 5 | 0 | 1 |
| 3 | 5 | 1 | 0 |

(3220, 3221, 3222, 3223; table 322)

FIG.5

| 0 | | | | | | | | | | | | | | | 15 | |
|---|---|---|---|---|---|---|---|---|---|---|---|---|---|---|---|---|
| USER ID | | | | | | | | GROUP ID | | | | | | | | ⎫ |
| TYPE | | | FLAG | | | | | ACCESS RIGHT | | | | | | | | |
| LAST ACCESS TIME | | | | | | | | LAST MODIFICATION TIME | | | | | | | | ⎬ FIRST FILE INFORMATION |
| NUMBER OF LINKS | | | | | | | | | | | | | | | | |
| FILE SIZE | | | | | | | | | | | | | | | | ⎭ |
| USER ID | | | | | | | | GROUP ID | | | | | | | | ⎫ |
| TYPE | | | FLAG | | | | | ACCESS RIGHT | | | | | | | | |
| LAST ACCESS TIME | | | | | | | | LAST MODIFICATION TIME | | | | | | | | ⎬ SECOND FILE INFORMATION |
| NUMBER OF LINKS | | | | | | | | | | | | | | | | |
| FILE SIZE | | | | | | | | | | | | | | | | ⎭ |

| LUN (1220) | MOUNT POINT (1221) | POWER SUPPLY STATE (1222) | FILE SYSTEM USAGE RATE [%] (1223) | MANAGEMENT COMPUTER IP ADDRESS (1224) |
|---|---|---|---|---|
| 0 | /dev/sd0 | 1 | 30 | 192.168.0.10 |
| 1 | /dev/sd1 | 0 | 20 | 192.168.0.10 |

| HOST WWN (2220) | SUBSYSTEM ID (2221) | LUN (2222) | DISK ID (2223) | PARTITION NUMBER (2224) | SUBSYSTEM IP ADDRESS (2225) | HOST IP ADDRESS (2226) | LAST ACCESS TIME (2227) |
|---|---|---|---|---|---|---|---|
| 10:00:34... | USP.149 | 0 | 0, 1, 2, 3 | - | 172.16.100.1 | 192.168.0.20 | 2006/11/10/ 16:12:30 |
| 10:00:34... | USP.149 | 1 | 4 | - | 172.16.100.1 | 192.168.0.20 | 2006/12/02/ 10:50:10 |
| 10:00:4E... | USP.149 | 2 | 5 | 0 | 172.16.100.1 | 192.168.0.21 | 2006/12/02/ 18:30:20 |
| 10:00:4E... | USP.149 | 3 | 5 | 1 | 172.16.100.1 | 192.168.0.21 | 2006/12/03/ 12:50:40 |

| LUN (3220) | DISK ID (3221) | PARTITION NUMBER (3222) | POWER SUPPLY CONTROL FLAG (3223) | LAST ACCESS TIME (3224d) |
|---|---|---|---|---|
| 0 | 0, 1, 2, 3 | - | - | 2006/11/10/16:12:30 |
| 1 | 4 | - | - | 2006/12/02/10:50:10 |
| 2 | 5 | 0 | 1 | 2006/11/10/16:12:30 |
| 3 | 5 | 1 | 0 | 2006/12/02/10:50:10 |

| LUN (3240) | MANAGEMENT COMPUTER IP ADDRESS (3241) |
|---|---|
| 0 | 192.168.0.10 |
| 1 | 192.168.0.10 |
| 2 | 192.168.0.20 |
| 3 | 192.168.0.20 |

STORAGE SYSTEM AND MANAGEMENT INFORMATION ACQUISITION METHOD FOR POWER SAVING

CROSS-REFERENCES TO RELATED APPLICATIONS

This application relates to and claims priority from Japanese Patent Application No. 2007-062283, filed on Mar. 12, 2007 the entire disclosure of which is incorporated herein by reference.

BACKGROUND

1. Field of the Invention

The invention relates generally to a storage system and a management information acquisition method for power saving in the storage system, and more particularly to methods suitable for use in a power saving technique for the storage system.

2. Description of Related Art

Recently, the volume of data used by companies or individuals is increasing rapidly. Consequently, storage systems utilizing technology such as SAN (Storage Area Network) or NAS (Network Attached Storage), that connects storage subsystems to host computers using switches or hubs and enables flexible data management, are widely used.

Meanwhile, since the scale of storage subsystems is increasing and their performance is being enhanced, power consumption in storage subsystems is also increasing. Accordingly, power saving in storage subsystems is being considered as more and more important.

There is a technique for achieving power saving in a storage system by setting, if a host computer that utilizes a storage region (hereinafter referred to as "volume") in a storage subsystem does not access the volume for a predetermined period of time, the power supply for the physical disks that compose the volume to 'off' or 'suspended' mode (hereinafter referred to collectively as "sleep mode"), and cancelling the sleep mode in the physical disks and returning them to regular power mode when the volume is accessed, thus controlling the power consumption in the storage subsystem.

For example, Japanese Patent Laid-Open Publication No. 2005-157710 discloses a technique for controlling, according to an order from a computer connected to a storage subsystem, power on/off in physical disks that compose a volume a storage subsystem provides.

Generally, there is a system configuration of storage system management in which an agent program for monitoring information about volumes used by a host computer is provided to the host computer to regularly acquire the information. If the above conventional technique is used in that system configuration, the agent program in the host computer cannot recognize that the physical disks are in sleep mode when the power supply for the physical disks included in the storage subsystem is set to sleep mode. Therefore, the agent program regularly accesses the physical disks regardless of power mode in the physical disks to acquire the volume information.

However, the volume information does not change while the physical disks are in sleep mode. In the conventional technique, the agent program in the host computer regularly accesses the physical disks to acquire information even though the information does not change. As a result, the sleep mode in the physical disks is frequently cancelled and power consumption in the storage subsystem increases.

An object of the invention is to provide a storage system and a management information acquisition method for power saving in a storage subsystem, the storage system being one in which the physical disks are not accessed while the power supply state in the physical disks is in sleep mode, so the sleep mode in the physical disks does not have to be unnecessarily cancelled and power consumption in the storage subsystem can be controlled.

SUMMARY

The present invention provides a storage system including: a storage subsystem including one or more physical device(s), a storage region composed of the one or more physical device(s), and a power supply control unit for controlling the state of the power supply in the physical device(s); a host computer including a storage region assigned from the storage subsystem, and a monitor for acquiring information for management of the assigned storage region; and a management computer including a power supply control indication unit for ordering the power supply control unit to shift the power supply state in the physical device(s) to 'on' or another state, and a notification unit for notifying the host computer of the shift in the power supply state in the physical device(s), wherein the host computer has a storage region information table that stores first information indicating the power supply state, i.e., whether or not the power supply state in the storage region is 'on,' and second information concerning the storage region, and wherein the monitor acquires, when acquiring the information for management of the storage region, the second information from the storage region if the power supply state in the storage region is 'on,' or acquires the second information stored in the storage region information table if the power supply state in the storage region is not 'on'.

In other words, a storage system includes: a storage subsystem including one or more physical device(s), a storage region composed of the one or more physical device(s), and a power supply control unit for controlling the state of the power supply in the physical device(s); a host computer having a storage region assigned from the storage subsystem, and a monitor for acquiring information for management of the assigned storage region; and a management computer including a power control indication unit for ordering the power supply control unit to shift the power supply state in the physical device(s) to 'on' or another state, and a notification unit for notifying the host computer of the shift in the power supply state in the physical device(s), wherein the monitor checks, when acquiring the information for management of the storage region, whether or not the power supply state in the storage region is 'on' based on the storage region information that stores first information indicating whether or not the power supply state in the storage region is 'on' and second information concerning the storage region, and the monitor acquires the second information from the storage region if the power supply state in the storage region is 'on,' or acquires the second information stored in the storage region information table if the power supply state in the storage region is not 'on'. With that configuration, access to a storage region in which the power supply state is not 'on' can be prevented.

With the present invention, the physical disks are not accessed while the power supply state in the physical disks is in sleep mode, so the sleep mode in the physical disks does not have to be unnecessarily cancelled and power consumption in the storage subsystem can be controlled.

BRIEF DESCRIPTION OF THE DRAWINGS

FIG. 2 is a diagram showing a volume information table in the first embodiment.

FIG. 3 is a diagram showing a volume management table in the first embodiment.

FIG. 4 is a diagram showing a power supply control table in the first embodiment.

FIG. 5 is a diagram showing an example of information concerning a file system stored in a physical disk in the first embodiment.

FIG. 20 is a diagram showing a volume information table not containing last access times in the second embodiment.

FIG. 21 is a diagram showing a volume management table containing last access times in the second embodiment.

FIG. 33 is a diagram showing a power supply control table containing last access times in the fourth embodiment.

FIG. 34 is a diagram showing a notification indication table in the fourth embodiment.

DETAILED DESCRIPTION OF PREFERRED EMBODIMENTS

A storage system and a management information acquisition method for power saving in the present invention used in a data processing system will be described below.

(1) First Embodiment (1-1) System Configuration

Figure 1:
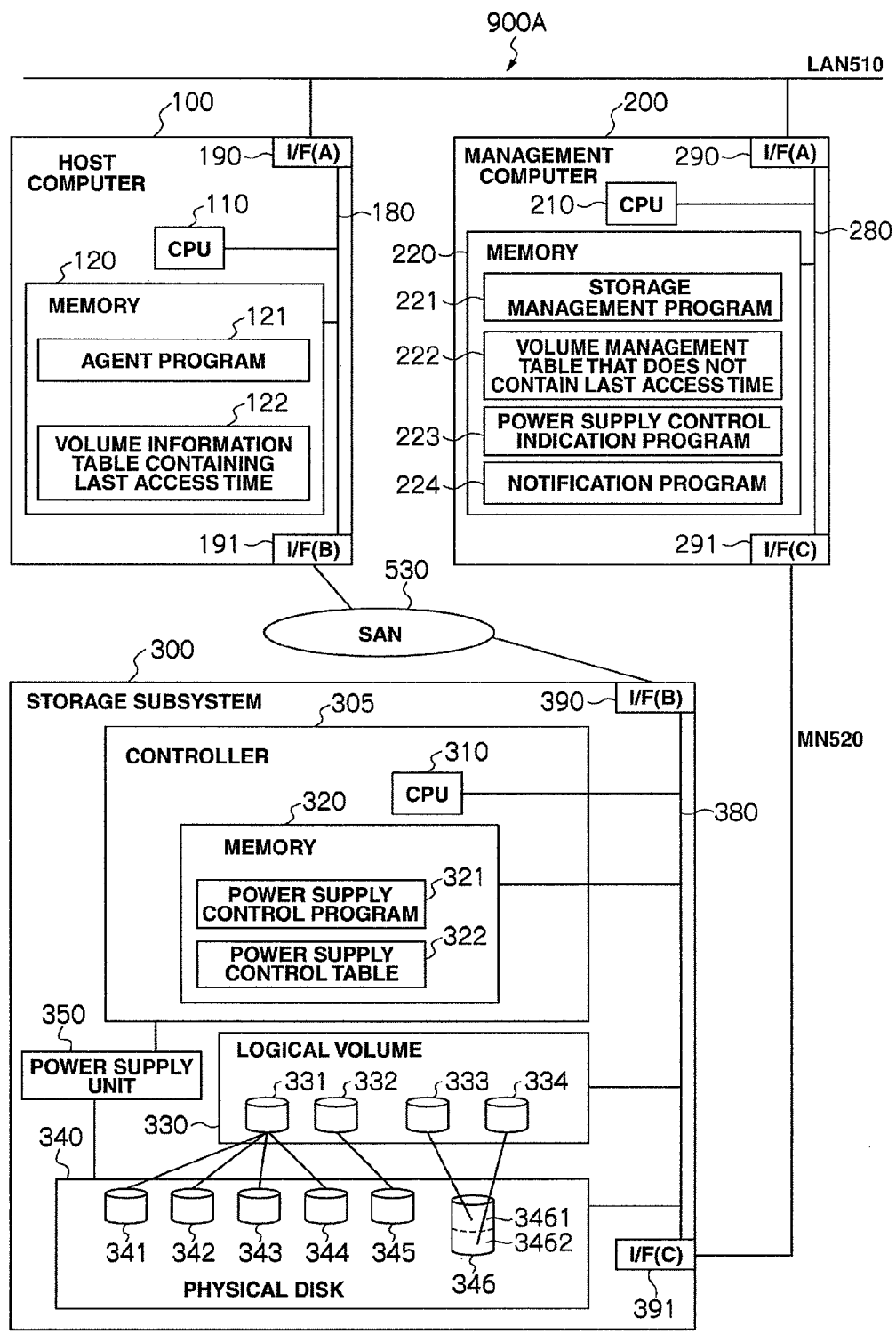
FIG. 1 is a diagram showing the configuration of a data processing system according to a first embodiment of the present invention.

FIG. 1 is an explanatory diagram showing the configuration of a data processing system in the first embodiment. A data processing system 900 includes one or more host computers 100, management computers 200, and storage subsystems 300.

Each host computer 100 is connected to the management computer 200 via a LAN (Local Area Network) 510. The host computer 100 is also connected to the storage subsystem 300 via a SAN (Storage Area Network) 530. Each management computer 200 is connected to the storage subsystem 300 via an MN (Management Network) 520.

The host computer 100 includes a CPU (Central Processing Unit) 110, memory 120, an I/F (Network Interface) (A) 190 for connection with the LAN 510, and an I/F (B) 191 for connection with the SAN 530. Those components are mutually connected via a bus 180.

Functions the host computer 100 has are achieved by having the CPU 110 execute programs stored in the memory 120. The memory 120 stores programs and data used by the CPU 110. Examples of programs stored in the memory 120 include an agent program 121, and those of data include a volume information table 122 containing last access times. The volume information table 122 will be described later.

The agent program 121 is a program executed by the CPU 110, and is designed to access a volume 330 provided by the storage subsystem 300 and execute processing for acquiring information concerning the volume 330. Although a file system usage rate is used as the information concerning the volume 330 in the first embodiment, the information does not have to necessarily be the file system usage rate.

Although the host computer 100 also has input devices for a user of the host computer 100 to input data and output devices for presenting information to the user, those devices do not directly relate to the present invention and so are not shown in the figures or described in the specification.

The management computer 200 includes a CPU 210, memory 220, an I/F (A) 290 for connection with the LAN 510, and an I/F (C) 291 for connection with the MN 520. Those components are mutually connected via a bus 280.

Functions the management computer 200 has are achieved by having the CPU 210 execute programs stored in the memory 220. The memory 220 stores programs and data used by the CPU 210. Examples of programs stored in the memory 220 include a storage management program 221, a power supply control indication program 223, and a notification program 224, and examples of data include a volume management table 222 not containing last access times. The volume management table 222 will be described later.

The storage management program 221 is a program executed by the CPU 210, and is designed to execute processing for management of the storage subsystem 300.

The power supply control indication program 223 is a program executed by the CPU 210, and is designed to order the power supply control program 321 stored in the memory 320 in the storage subsystem 300 to set the state of the power supply for the volume 330 to sleep mode and cancel the sleep mode.

The notification program 224 is a program executed by the CPU 210, and is designed to notify the host computer 100 of the shift in the power supply state in the volume 330.

Although the management computer 200 also includes input devices for a user of the management computer 200 to input data and output devices for presenting information to the user, those devices do not directly relate to the invention and so are not shown in the figures or described in the specification.

Each storage subsystem 300 includes a controller 305, a volume 330, a physical disk 340, a power supply unit 350, an I/F (B) 390 for connection with the SAN 530, and an I/F (C) for connection with the MN 520.

The "volume 330" indicates a logical storage region composed of physical resources provided by the one or more physical disks 340, that is provided by the storage subsystem 300 so that the host computer 100 can store data in that region. In FIG. 1, there are four logical volumes (volumes 331, 332, 333, 334) and six physical disks (physical disks 341, 342, 343, 344, 345, 346). However, any number equal to or greater than 1 may be possible.

Also, in FIG. 1, the volume 331 is composed of the physical disks 341, 342, 343, and 344, the volume 332 from the physical disk 345, the volume 333 from a partition 3461 in the physical disk 346, and the volume 334 from another partition 3462 in the physical disk 346. However, the structure of the volumes is not limited to the above, and all that is required is that one or more volumes (physical disks) correspond to one or more physical disks (volumes).

The controller 305 includes a CPU 310 and memory 320. Those components are mutually connected via a bus 380. The control functions for the storage subsystem 300 are realized by having the CPU 310 execute programs stored in the memory 320. The memory 320 stores programs and data used by the CPU 310. Examples of programs stored in the memory 320 include a power supply control program 321, and those of data include a power supply control table 322. The power supply control table 322 will be described later.

The power supply control program 321 is a program executed by the CPU 310, and is designed to control the quantity of the power supply to the physical disks 340 and the controller 305 by controlling the power supply unit 350, physical disks 340, and controller 305. However, the target of the power supply quantity controlled by the power supply control program 321 is not limited to the physical disks 340 and the controller 305.

Although the storage subsystem 300 may also include input devices for a user of the storage subsystem 300 to input data or output devices for presenting information to the user, those devices do not directly relate to the invention and so are not shown in the figures or described in the specification.

FIG. 2 is a diagram showing the volume information table 122 containing last access times. As shown in FIG. 2, the volume information table 122 is designed to show information concerning the volume 330 assigned to the host computer 100.

The volume information table 122 contains entries for LUNs (Logical Unit Number(s)) 1220, which are ID numbers for the volume 330, mount points 1221 on the volume 330, the power supply states 1222 in the volume 330, file system usage rates 1223 in the volume 330, the time 1224 of the last access made from the host computer 100 to the volume 330, and IP addresses 1225 for identifying the management computer that manages the storage subsystem providing the volume.

As shown in FIG. 2, the volume information table 122 stores information such as "0" as the LUN entry 1220, "/dev/sd0" as the mount point entry 1221, "1" as the power supply state 1221, "30" as the file system usage rate entry 1223, "2006/11/10/16:12:30" as the last access time entry 1224, and "192. 168. 0.10" as the management computer IP address entry 1225.

Although in FIG. 2 power supply 'on' mode is indicated as "1" and power supply 'off' mode or 'suspended' mode (referred to collectively as "sleep mode") is indicated as "0," those particular numbers do not have to be used. Likewise, although the file system usage rate 1223 is shown in FIG. 2 as the information concerning the volume 330, the information does not have to be the file system usage rate. The information for identifying the management computer does not have to be the IP address. The volume information table 122 may also contain the power supply state in the controller 305 for controlling the volume.

FIG. 3 is a diagram showing the volume management table 222 not containing the last access times. As shown in FIG. 3, the volume management table 222 contains entries for host WWNs 2220 for identifying the host computer 100, subsystem IDs 2221 for identifying the storage subsystem 300 that provides the volume 330, LUNs (Logical Unit Numbers) 2222, which are ID numbers for the logical volumes in the volumes 330, disk IDs 2223 for identifying one or more physical disks 340 that form the volume 330, partition numbers 2224 for identifying partitions in the physical disk 340, storage subsystem IP addresses 225, and host computer IP addresses 2226.

As shown in FIG. 3, the volume management table 222 stores "10:00:34 . . . " as the host WWN entry 2220, "USP. 149" as the subsystem ID entry 2221, "0" as the LUN entry 2222, "0, 1, 2, 3" as the disk ID entry 2223, "-" as the partition number entry 2224, "172.16.100.1" as the subsystem IP address entry 2225, and "192. 168. 0. 20" as the host IP address 2226.

However, the information for identifying the host computer 100 is not limited to the host WWN 2220, and may be any information with which the host computer 100 can be specifically identified. Likewise, how the subsystem ID entry 2221, the LUN entry 2222, the disk ID entry 2223, and the partition number entry 2224 are indicated is not limited to what is shown in FIG. 2, and the entries may be indicated in any fashion so long as the storage subsystem 300, the volume 330, the physical disk 340, and the partition in the physical disk 340 can be specifically identified with the table. The correspondence between the volume 330 and the physical disks 340 that form the volume 330 is not limited to that shown in FIG. 3, and all that is required is that one or more logical (physical) volumes correspond to one or more physical (logical) volumes.

FIG. 4 is a diagram showing the power supply control table 322. As shown in FIG. 4, the power supply control table 322 contains entries for the LUNs (Logical Unit Numbers) 3220, disk IDs 3221 for identifying the physical disks 340 that form each logical volume in the volume 330, partition numbers 3222 for identifying partitions in the physical disks, and power supply control flags 3223 for each partition that indicate whether or not the power supply state in the physical disk 340 can be set to sleep mode.

As shown in FIG. 4, the power supply control table 322 stores "0" as the LUN entry 3220, "0, 1, 2, 3" as the disk ID entry 3221, "-" as the partition number entry 3222, and "-" as the power supply control flag entry 3223.

In FIG. 4, if the power supply control flags 3223 for all partitions included in the physical disk 340 are "1," the power supply state in the physical disk 340 can be set to sleep mode. However, how to indicate the power supply control flags 3223 is not limited to the above.

FIG. 5 shows examples of information concerning the file system stored in the physical disk 340. In FIG. 5, the examples for the file system information stored in the physical disk are shown in units of 16 bits.

As shown in FIG. 5, file information for each file is stored as "information on the first file" and "information on the second file." Information on each file includes a user ID for identifying the user that possesses the file, a group ID for identifying the group the file owner belongs to, the file type—such as 'file' or 'directory,' a flag used for controlling behavior during file manipulation the access right of the file owner or group, the time when the file was last accessed, the time when the file was last modified, the number of links provided to the file, and the file size.

(1-2) Explanation of Data Processing Sequence

Figure 6:
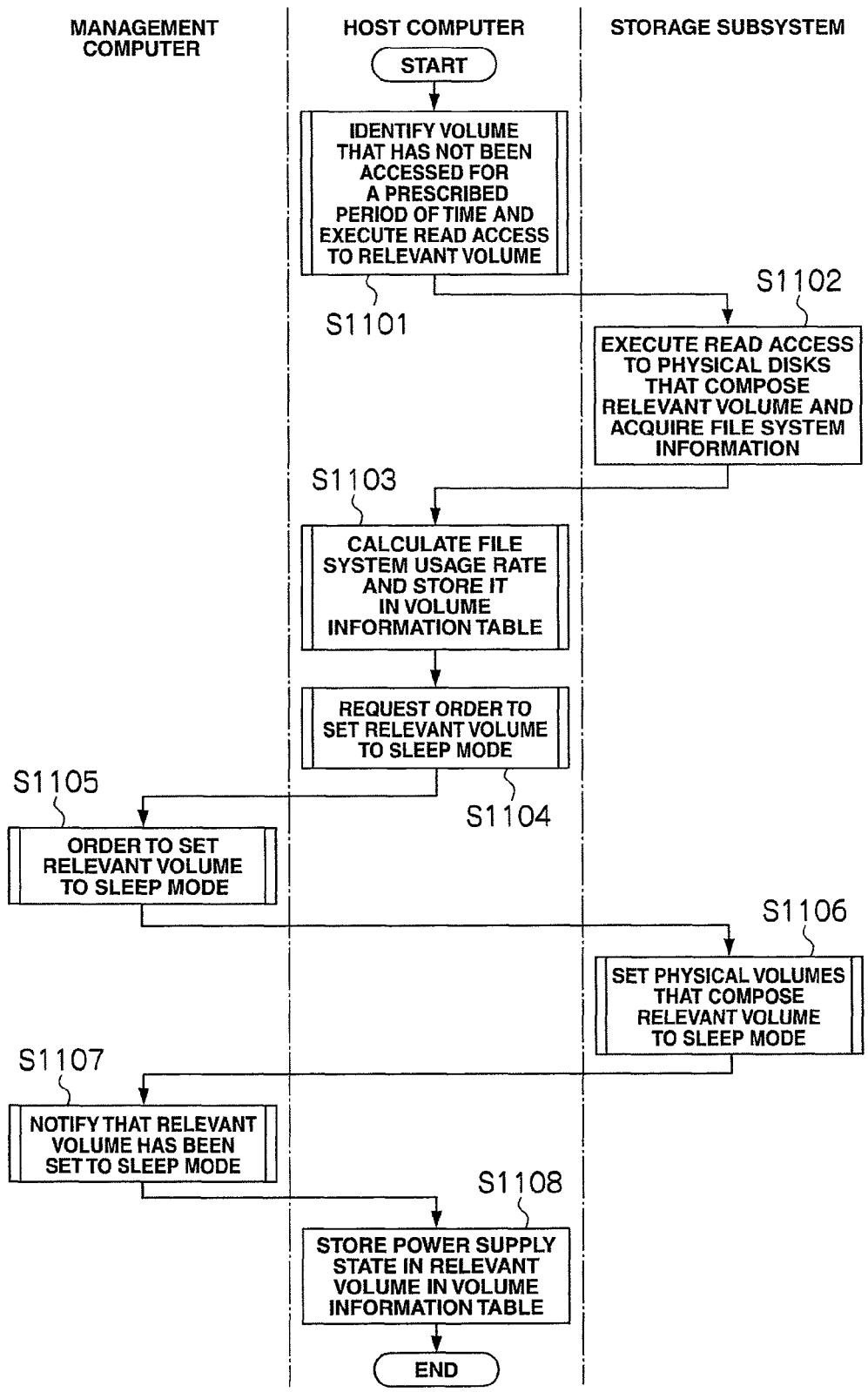
FIG. 6 is a flowchart showing the outline of a processing sequence followed by each device when setting the power supply state in a volume to sleep mode in the first embodiment.
Figure 12:
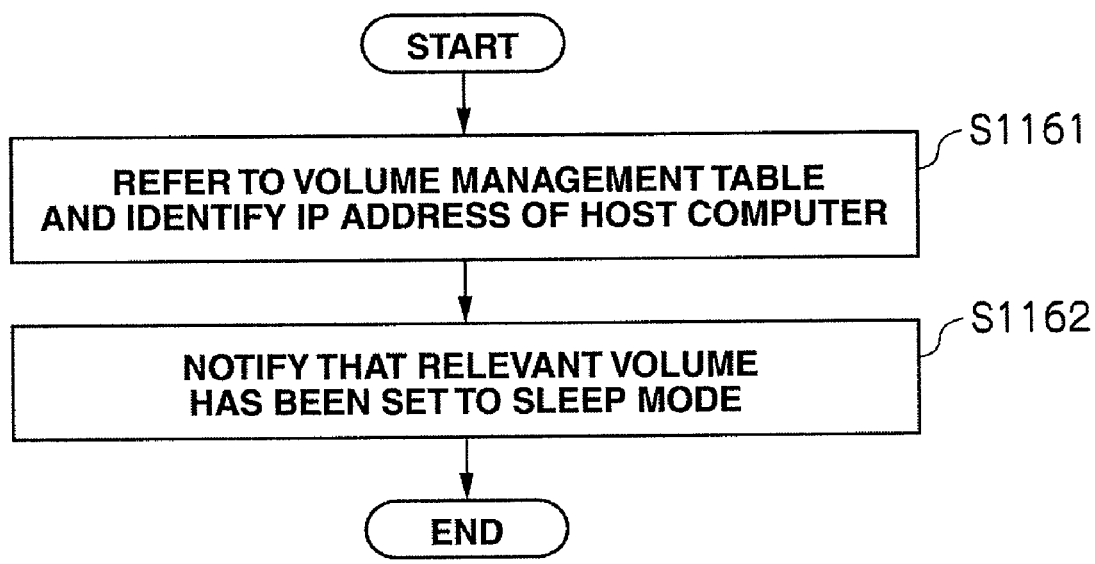
FIG. 12 is a sub-flowchart relating to the first embodiment.
Figure 13:
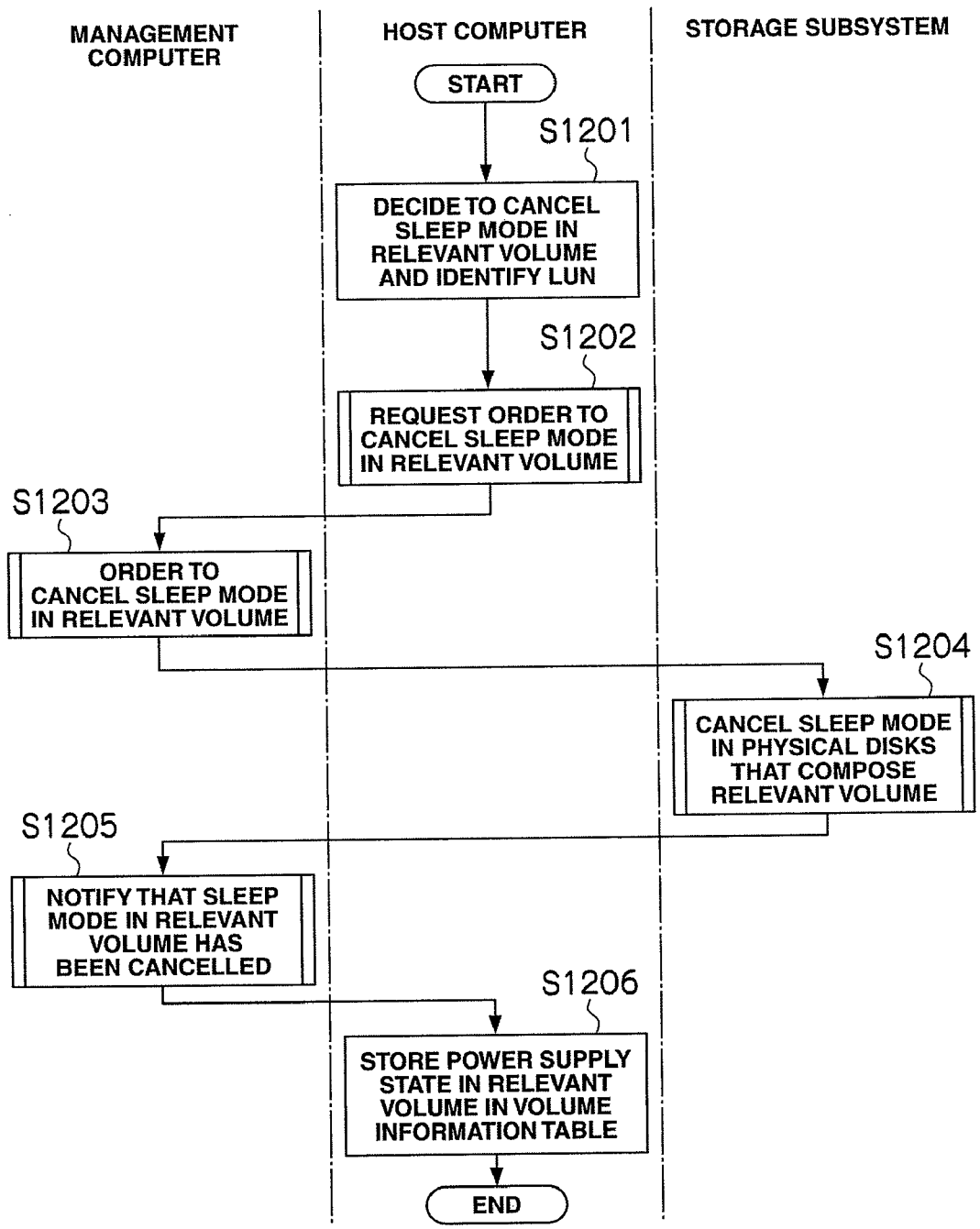
FIG. 13 is a flowchart showing the outline of a processing sequence followed by each device when cancelling the sleep mode in the volume in the first embodiment.

FIGS. 6 and 13 are flowcharts each showing the outline of a processing sequence followed by the management computer 200, the host computer 100, and the storage subsystem 300. FIGS. 7-12 are sub-flowcharts showing predetermined sequences in the processing sequence shown in FIG. 6, and FIGS. 14-17 are sub-flowcharts showing predetermined sequences in the processing sequence shown in FIG. 13 in detail.

FIG. 6 is a flowchart showing the outline of a processing sequence followed by each device when setting the power supply state in the volume 330 to sleep mode.

First, in step S1101, the CPU 110 identifies any logical volumes in the volumes 330 that have not been accessed for a predetermined period of time and executes read access to those volumes. The cause for setting a logical volume in the volume 330 to sleep mode is not limited to a lack of access to the logical volume.

Figure 7:
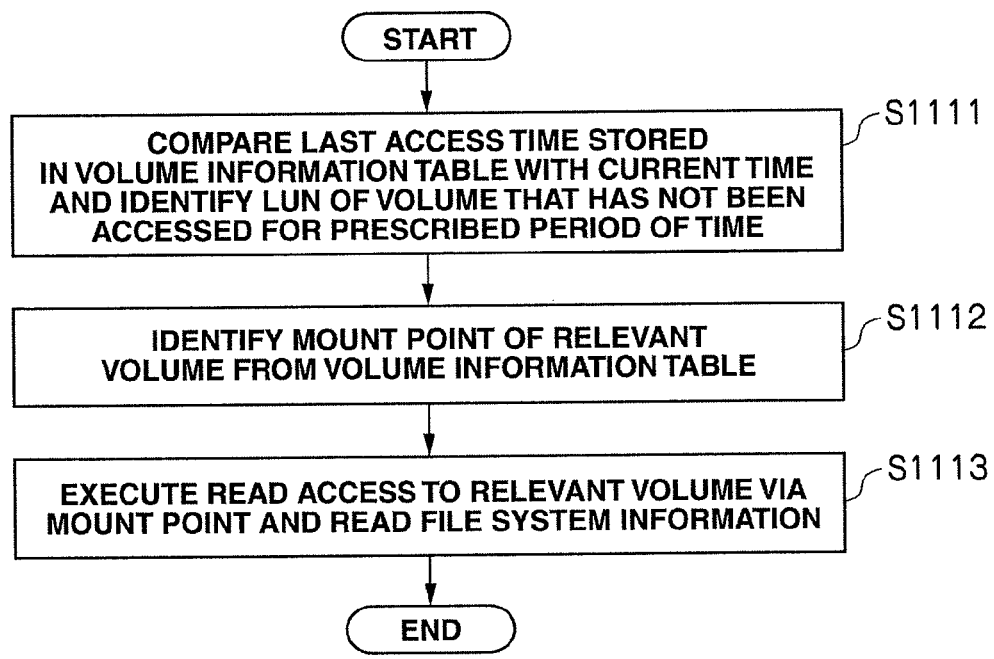
FIG. 7 is a sub-flowchart relating to the first embodiment.

The content of the processing in step S1101 is shown in detail in the sub-flowchart in FIG. 7. The CPU 110 in the host computer 100 compares the last access time 1224 in the volume information table 122 with the current time to identify a logical volume in the volume 330 that has not been accessed for a predetermined period of time and identifies its LUN 1220. Next, in step S1112, the CPU 110 refers to the volume information table 122 and identifies the mount point 1221 of the logical volume in the volume 330. In step S1113, the CPU 110 executes read access to that logical volume in the storage subsystem 330 via the mount point 1221 and reads the file system information in the logical volume. The processing sequence in step S1101 is performed as above.

Next, in step S1102, the CPU 310 in the storage subsystem 300 executes read access to the logical volume based on the read access from the CPU 110 in the host computer 100. In other words, the CPU 310 executes read access to the physical disks that compose the logical volume and acquires the file system information. The thus-acquired file system information is sent to the host computer 100.

Figure 8:
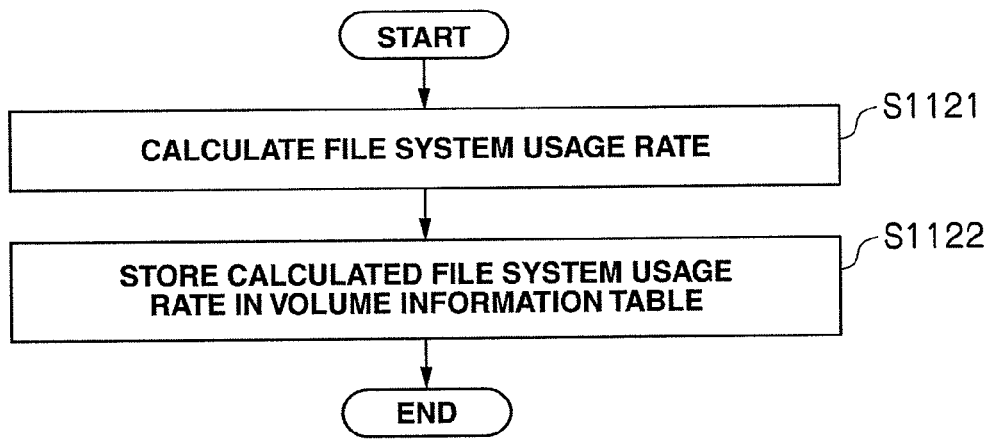
FIG. 8 is a sub-flowchart relating to the first embodiment.

Next, in step S1103, the CPU 110 in the host computer 100 calculates the file system usage rate in the logical volume based on the acquired file system information (S1121), and stores the thus-calculated file system usage rate in the volume information table 122 (S1122). FIG. 8 is a sub-flowchart showing the processing in step S1103 in detail. In this embodiment, the proportion of the capacity of the volume 330 occupied by the sum of the size of the information concerning the file system shown in FIG. 5 and the size of all files is used as the file system usage rate.

Next, in step S1104, the CPU 110 in the host computer 100 requests that the management computer 200 set the logical volume to sleep mode.

Figure 9:
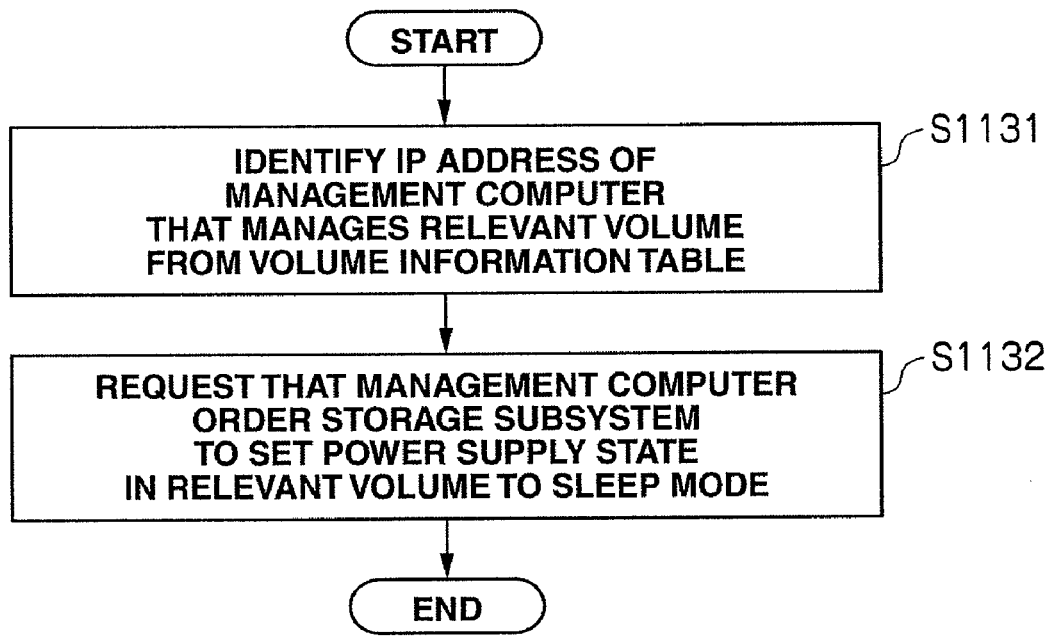
FIG. 9 is a sub-flowchart relating to the first embodiment.

The details of the processing in step S1104 are shown in the sub-flowchart in FIG. 9. In step S1131, the CPU 110 identifies, from the volume information table 122, the IP address of the management computer that manages the volume. In step S1132, the CPU 110 requests that the above identified management computer 200 order the storage subsystem 300 to set the power supply state in that volume to sleep mode. The processing in step S1104 is performed as above.

In step 1105, the CPU 210 in the management computer 200 orders the storage subsystem 300 to set the volume to sleep mode.

Figure 10:
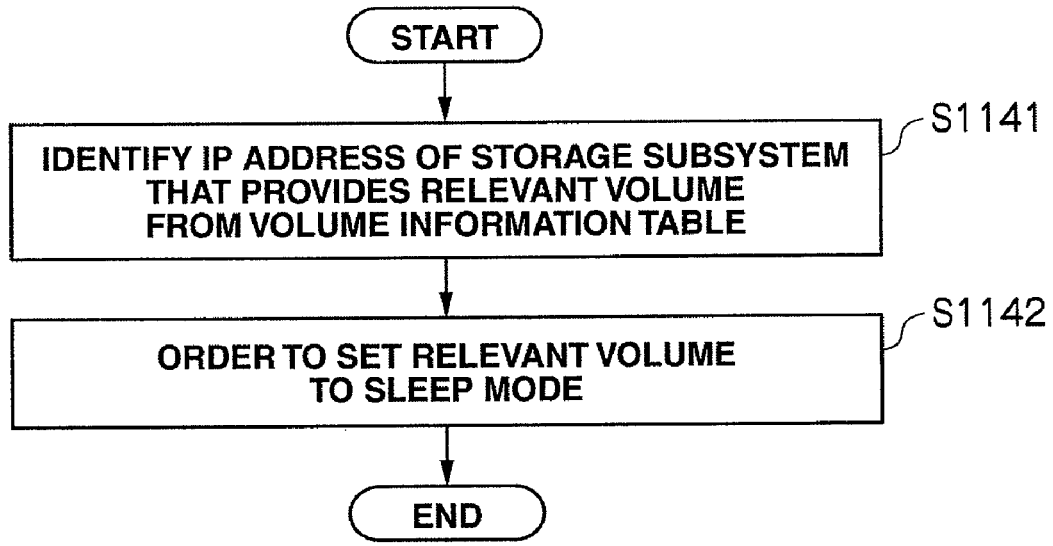
FIG. 10 is a sub-flowchart relating to the first embodiment.

The detail of the processing in step S1105 is shown in the sub-flowchart in FIG. 10. In step S1141, the CPU 210 executes the power supply control indication program 223 to acquire, from the volume management table 222, the IP address of the storage subsystem that provides the volume. In step S1142, the CPU 210 then orders the storage subsystem 300 to set the power supply state in the volume to sleep mode. The processing in step S1105 is performed as above.

Next, in step S1106, the CPU 310 in the storage subsystem 300 sets the power supply state in all physical disks 340 that form the volume 330 to sleep mode. Information indicating the end of this setting is sent from the CPU 310 to the management computer 200.

Figure 11:
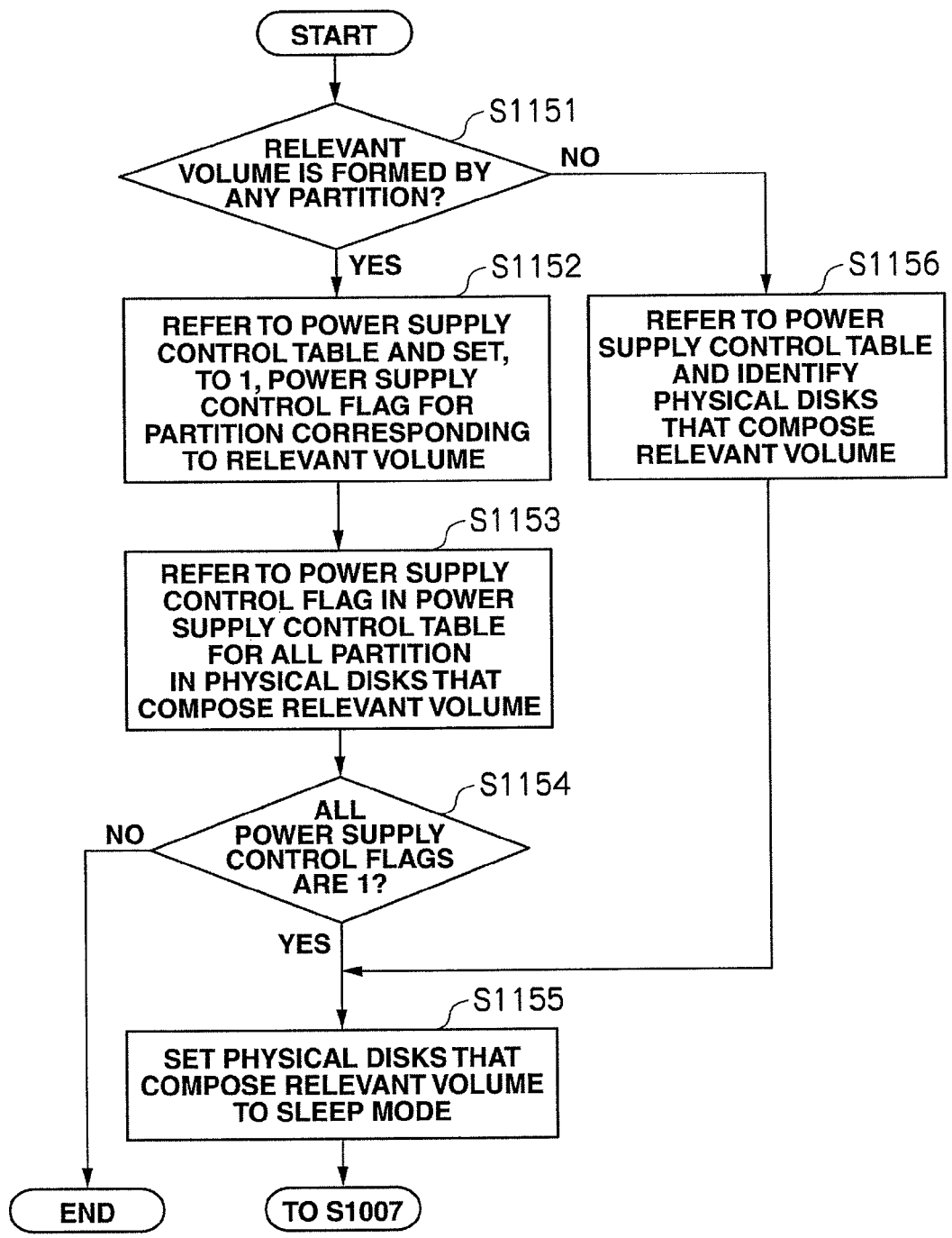
FIG. 11 is a sub-flowchart relating to the first embodiment.

The detail of the processing in step S1106 is shown in the sub-flowchart in FIG. 11. In step S1151, the CPU 310 refers to the power supply control table 322 and checks whether or not the logical volume is composed of any partitions in the physical disks 340.

If the logical volume is composed of a partition (S1151: YES), the CPU 310 refers, in step S1152, to the power supply control table 322 and sets the power supply control flag 3223 corresponding to the partition that forms the logical volume to "1."

In step S1153, the CPU 310 refers to the power supply control flag entries 3223 in the power supply control table 322 corresponding to all partitions in the physical disks that compose the volume.

In step S1154, the CPU 310 checks whether or not all power supply control flag entries 3223 are "1." If all power supply control flags are "1" (S1154: YES), the CPU 310 sets, in step S1155, the power supply state in the physical disks 340 that form the volume to sleep mode. If one or more power supply control flags are "0," the CPU 310 does not set the power supply state in the physical disks 340 to sleep mode.

In step S1151, if the logical volume is not composed of any partitions (S1151: NO), the CPU 310 refers, in step S1156, to the power supply control table 322 to identify the physical disks 340 that form the logical volume, and sets, in step S1155, the power supply state in the physical disks 340 that form the logical volume to sleep mode. The processing in step S1106 is performed as above.

Next, in step S1107, the CPU 210 in the management computer 200 notifies the host computer 100 that the volume has been set to sleep mode. In this step, the notification program 224 in the management computer 200 is executed by the CPU 210.

The detail of step S1107 is shown in the sub-flowchart in FIG. 12. In step S1161, the CPU 310 refers to the volume management table 222 to identify the IP address of the host computer 100. In step S1162, the CPU 210 notifies the host computer 100 that the volume has been set to sleep mode. The processing in step S1107 is performed as above.

Next, in step 1108, the CPU 110 in the host computer 100 stores the power supply state in the logical volume in the volume information table 122.

The power supply state in the logical volume can be set to sleep mode by having the management computer 200, the host computer 100, and the storage subsystem 300 execute the processing that has been explained above with reference to FIGS. 6-12.

FIG. 13 is a flowchart showing the outline of the processing sequence followed by each device when cancelling sleep mode in the volume 330.

In step S1201, the CPU 110 decides to cancel sleep mode in a logical volume in the volume 330 and return the logical volume to its regular power supply state by executing the agent program 121 in the host computer 100. The cause for cancelling sleep mode in the volume 330 is not expressly limited.

Next, in step S1202, the CPU 110 requests that the management computer 200 order the storage subsystem 300 to cancel the sleep mode in the logical volume.

Figure 14:
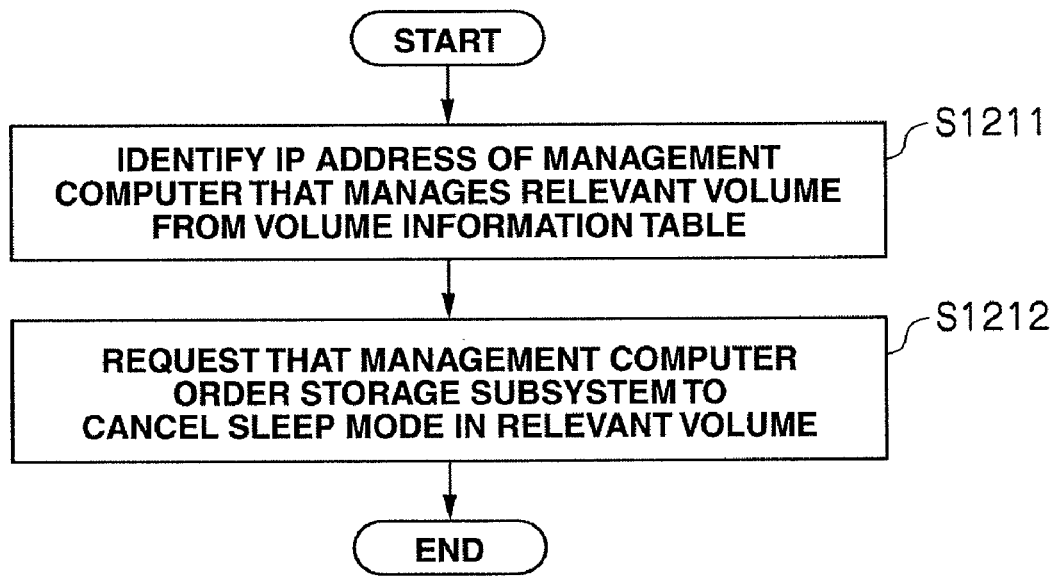
FIG. 14 is a sub-flowchart relating to the first embodiment.

The detail of the processing in step S1202 is shown in the sub-flowchart in FIG. 14. In step S1211, the CPU 110 identifies, from the volume information table 122, the IP address of the management computer 200 that manages the volume. In step S1212, the CPU 110 requests that the thus-identified management computer 200 order the storage subsystem 300 to cancel sleep mode in the volume. The processing in step S1202 is performed as above.

Next, in step S1203, the CPU 210 in the management computer 200, after receiving the order issued in S1202, orders the storage subsystem 300 to cancel sleep mode in the logical volume in the volume 330.

Figure 15:
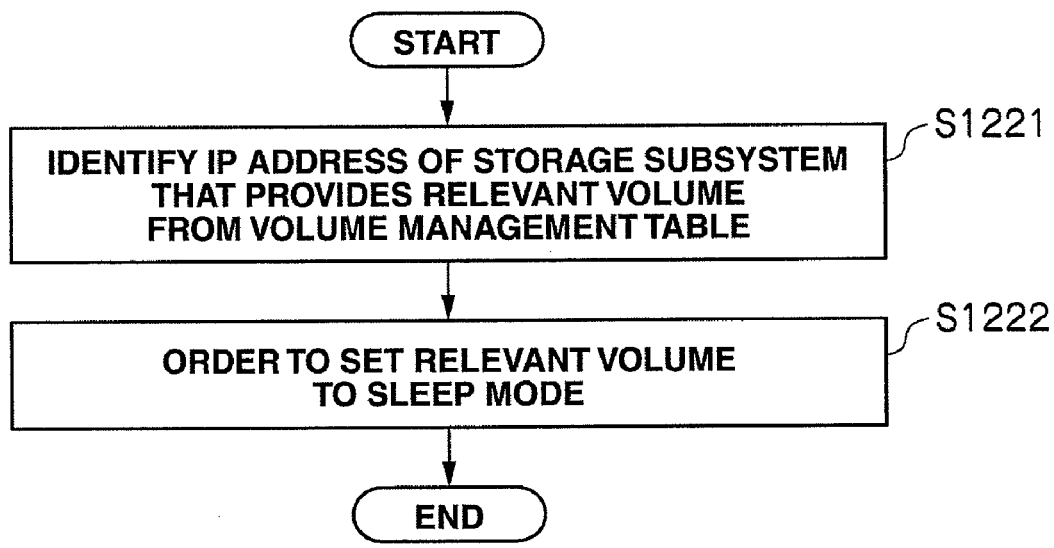
FIG. 15 is a sub-flowchart relating to the first embodiment.

The details of the processing in step S1203 are shown in the sub-flowchart in FIG. 15. In step S1221, the CPU 210 identifies, from the volume management table 222, the IP address of the storage subsystem 300 that provides the volume. In step S1222, the CPU 210 orders the storage subsystem 300 to set the volume to sleep mode. The processing in step S1203 is performed as above.

Next, in step S1204, the CPU 310 in the storage subsystem 300, after receiving the order issued in step S1203, cancels sleep mode in the physical disks 340 that form the volume.

Figure 16:
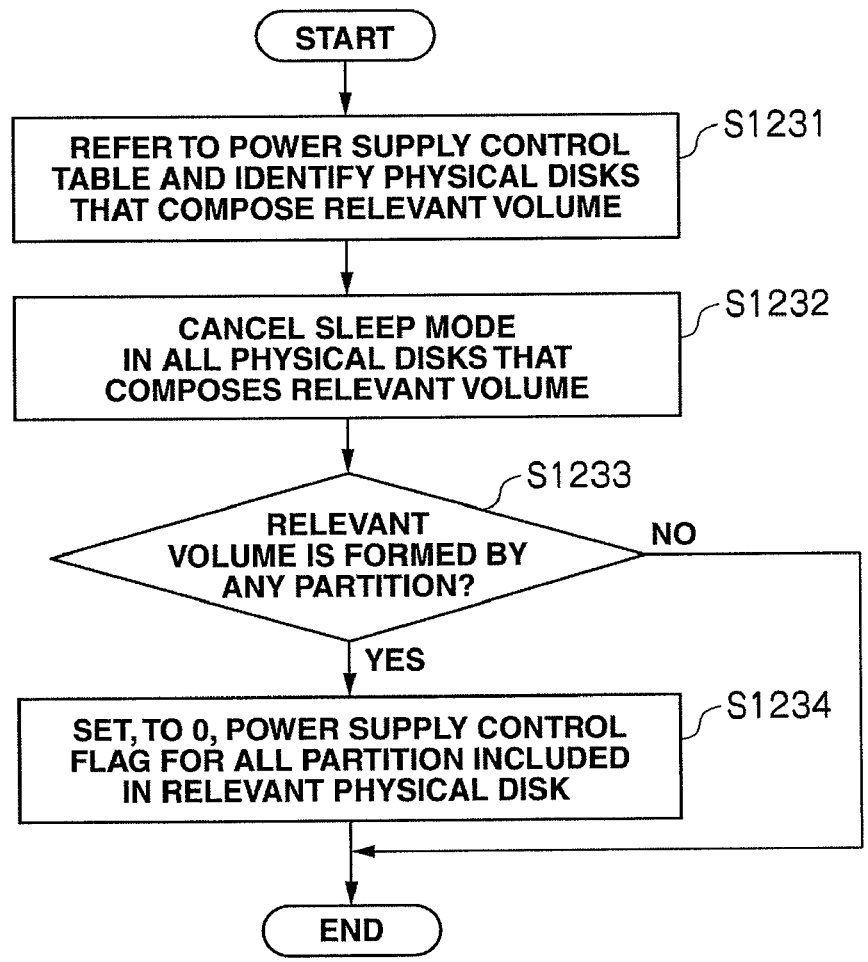
FIG. 16 is a sub-flowchart relating to the first embodiment.

The details of the processing in step S1204 are shown in the sub-flowchart in FIG. 16. In step S1231, the power supply control program 321 in the storage subsystem 300 refers to the power supply control table 322, and the CPU 310 identifies the physical disks that compose the logical volume in the volume 330. In step S1232, the CPU 310 cancels sleep mode in all physical disks 340 that form the logical volume. In step S1233, the CPU 310 checks whether or not the logical volume is composed of any partitions in the physical disks 340.

If the logical volume is composed of a partition (S1233: YES), the CPU 310 refers, in step S1234, to the power supply control table 322 and sets the power supply control flags 3223 corresponding to all partitions included in the physical disks 340. If the logical volume is not composed of any partition (S1233: NO), the processing in step S1234 is skipped. The sleep mode in the physical disks that compose the logical volume in the volume 330 is canceled by executing the processing in those steps S1231 to S1234. The processing in step S1204 is performed as above.

Next, in step S1205, the CPU 210 in the management computer 200 notifies the host computer 100 that sleep mode in the logical volume in the volume 330 has been cancelled.

Figure 17:
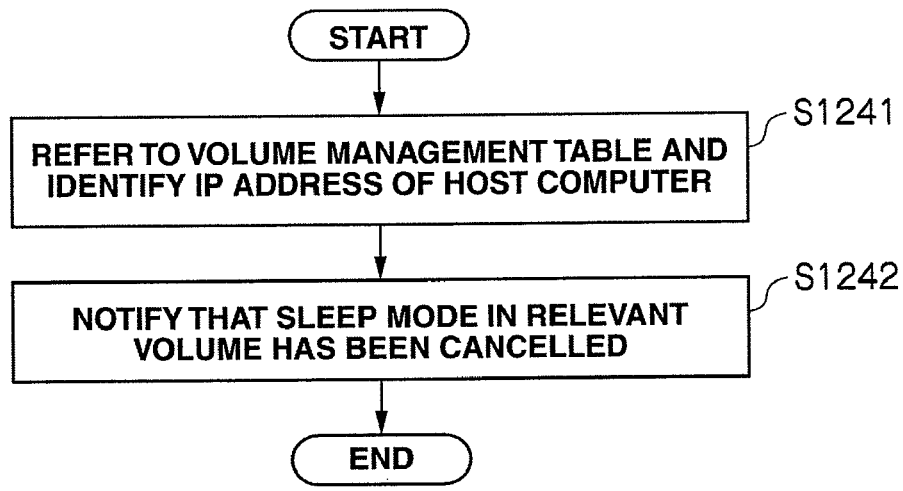
FIG. 17 is a sub-flowchart relating to the first embodiment.

The details of the processing in step S1205 are shown in the sub-flowchart in FIG. 17. In step S1241, the CPU 210 refers to the volume management table 222 and identifies the IP address of the host computer 100 the volume 330 is assigned to. In step S1242, the CPU 210 notifies the above identified host computer 100 that sleep mode in the logical volume has been cancelled. The processing in step S1205 is performed as above.

Next, in step S1206, the CPU 110 in the host computer 100 stores the power supply state in the logical volume in the volume information table 122.

Figure 18:
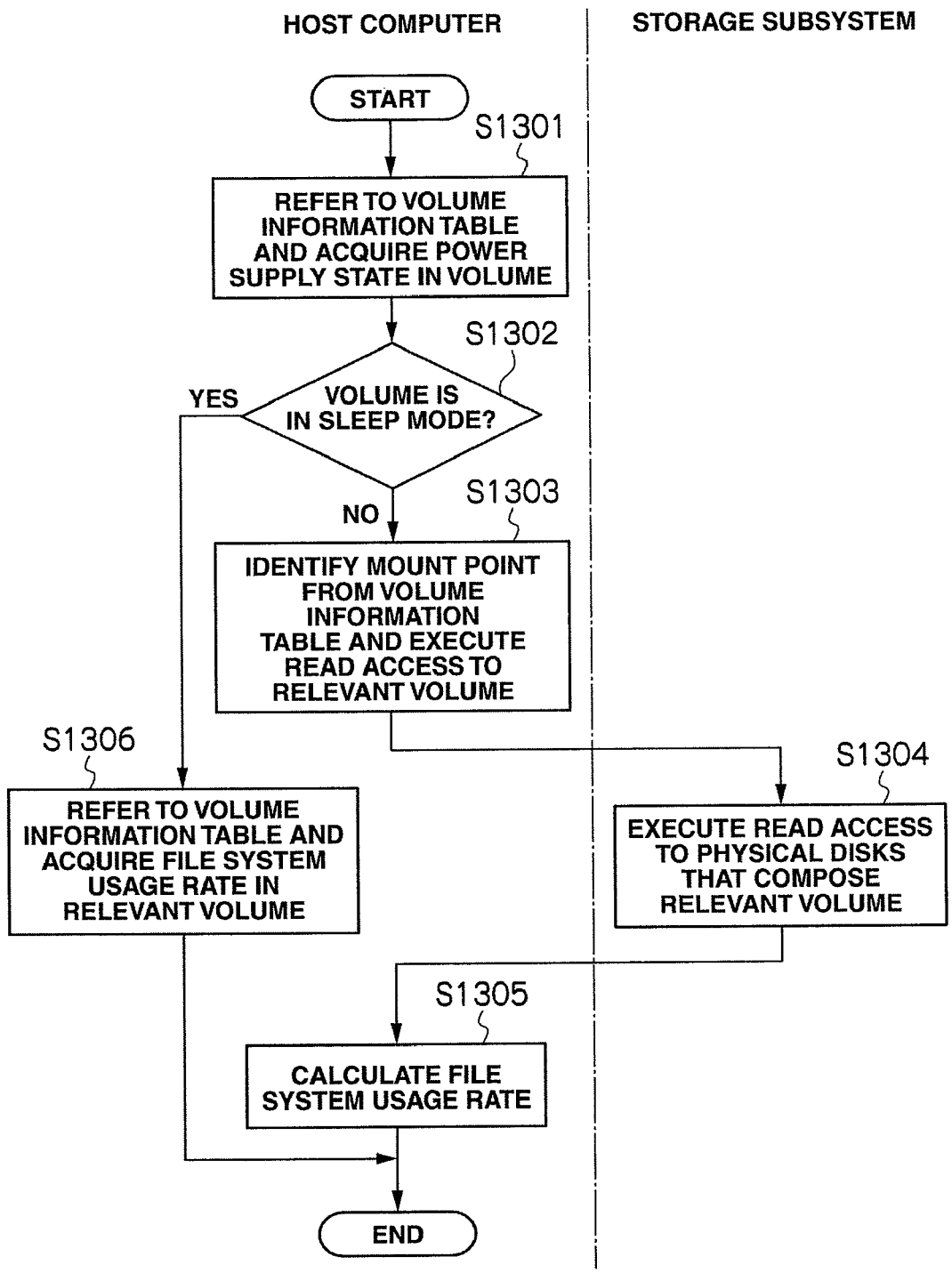
FIG. 18 is a flowchart showing a processing sequence followed when acquiring a file system usage rate in the first embodiment.

Next, the processing sequence followed by the CPU 110 in the host computer 100 to acquire the file system usage rate in the volume 330 assigned to the host computer 100 will be described. FIG. 18 is a flowchart showing the processing sequence for acquiring the file system usage rate.

In step S1301, the CPU 110 in the host computer 100 refers to the volume information table 122 to acquire the power supply state in the logical volume in the volume 330 that is the target of the file system usage rate acquisition. Next, in step S1302, the CPU 110 checks whether or not the power supply state in the relevant logical volume is sleep mode. If the power supply state in the logical volume is not sleep mode (S1302: NO), the CPU 110 executes, in step S1303, read access to the logical volume in the storage subsystem 300.

After the CPU 110 executes read access in step S1303, the CPU 310 in the storage subsystem 300 executes, in step S1304, read access to the physical disks 340 that form the logical volume, acquires information concerning the file system in the logical volume, and sends the information to the host computer 100.

In step S1304, the CPU 110 calculates the file system usage rate based on the information sent from the storage subsystem 300. In step S1302, if the power supply state in the logical volume is in sleep mode (S1302: YES), the CPU 110 refers, in step S1306, to the volume information table 122 and acquires the file system usage rate of the logical volume.

As described above, even when acquiring information concerning any logical volumes in the volumes 330, the volume 330 is not accessed from the host computer 100 while that volume is in sleep mode. Accordingly, the sleep mode in the volume 330 is not unnecessarily cancelled, so the power consumption in the storage subsystem 300 can be controlled.

(2) Second Embodiment (2-1) System Configuration

Figure 19:
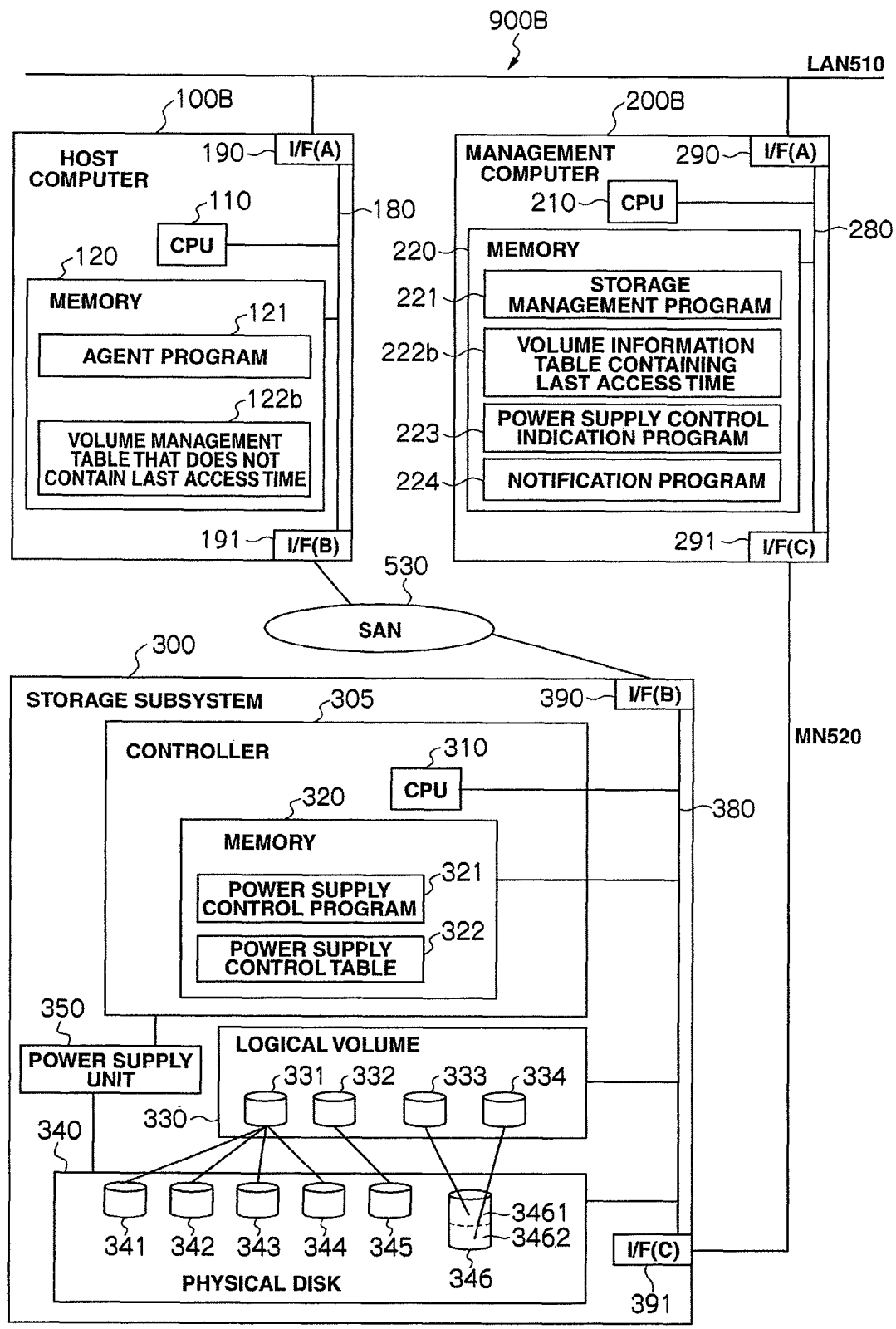
FIG. 19 is a diagram showing the configuration of a data processing system according to a second embodiment of the invention.

FIG. 19 is a diagram illustrating a configuration of the data processing system according to a second embodiment of the present invention. The data processing system 900B includes one or more host computers 100B, management computers 200B, and storage subsystems 300. Since most of the configuration of the data processing system 900B is the same as in the first embodiment, the same reference numbers are used for the same components and a detailed explanation will be omitted. Only the differences between the data processing system 900B and the data processing system 900 will be described below.

The difference between the data processing system 900 shown in FIG. 1 and the data processing system 900B is the feature that the memory 120 in the host computer 100B has a volume management table 222b not containing the last access times, and the memory 220 in the management computer 200B has a volume management table containing the last access times.

The difference between the volume information table 122 not containing the last access times shown in FIG. 20 and the volume information table 122 containing the last access times shown in FIG. 2 is only the feature that the volume information table 122 not containing the last access times does not contain the time when the host computer 100 accesses the logical volume last.

The difference between the volume management table 222b containing the last access times shown in FIG. 21 and the volume management table 222 not containing the last access times shown in FIG. 3 is only the feature that the volume management table 222b containing the last access times contains the time when the host computer 100B accesses the volume 330 last.

(2-2) Explanation of Data Processing Sequence

Since most of the operations in this embodiment are the same as those in the first embodiment, only the differences will be described below. In the first embodiment, when to shift the power supply state in the volume is decided by having the CPU 110 in the host computer 100B execute the agent program 121. However, in the second embodiment, when to shift the power supply state in the volume 330 is decided by having the CPU 210 in the management computer 200B execute the storage management program 221.

Figure 22:
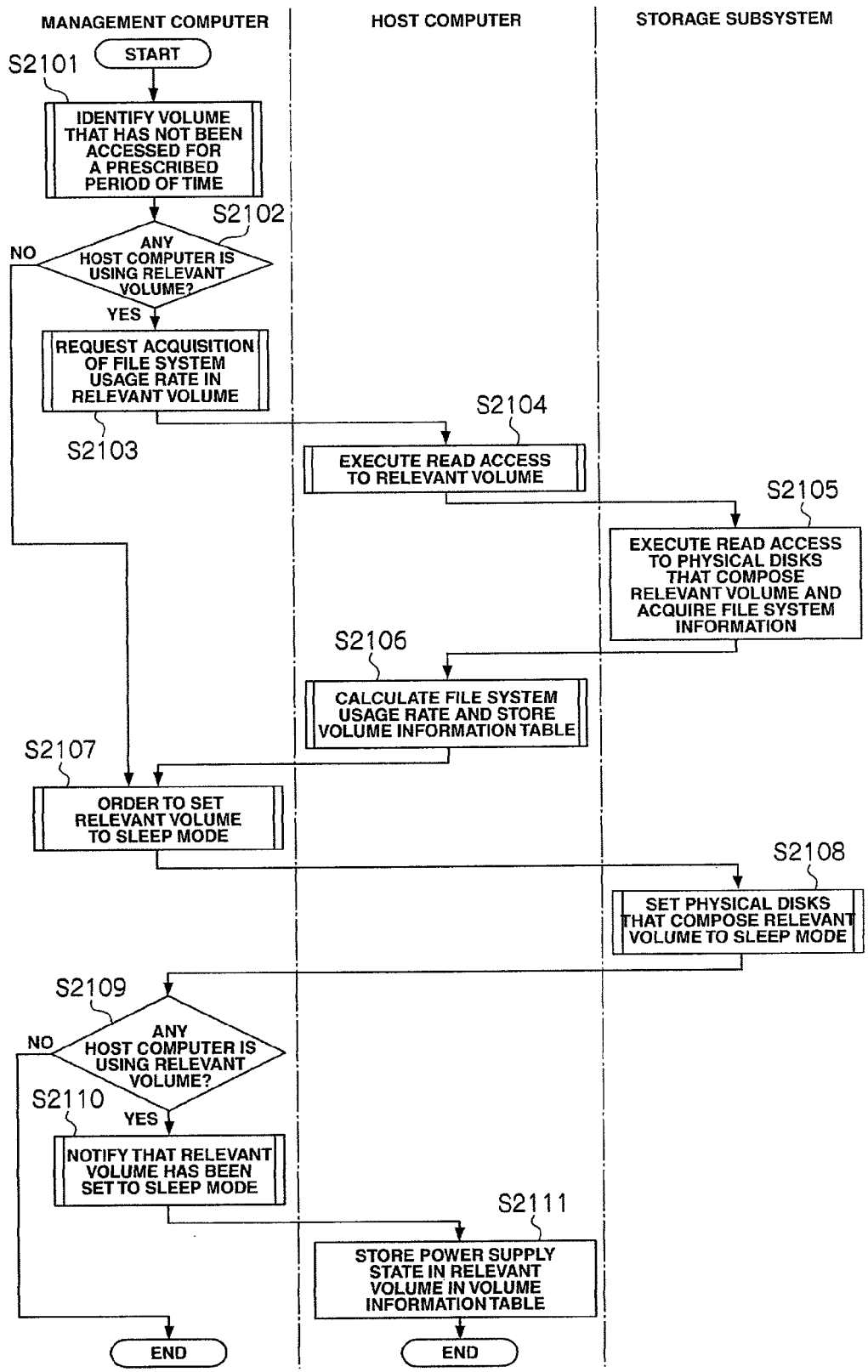
FIG. 22 is a flowchart showing the outline of a processing sequence followed by each device when setting the volume power supply state to sleep mode in the second embodiment.
Figure 23:
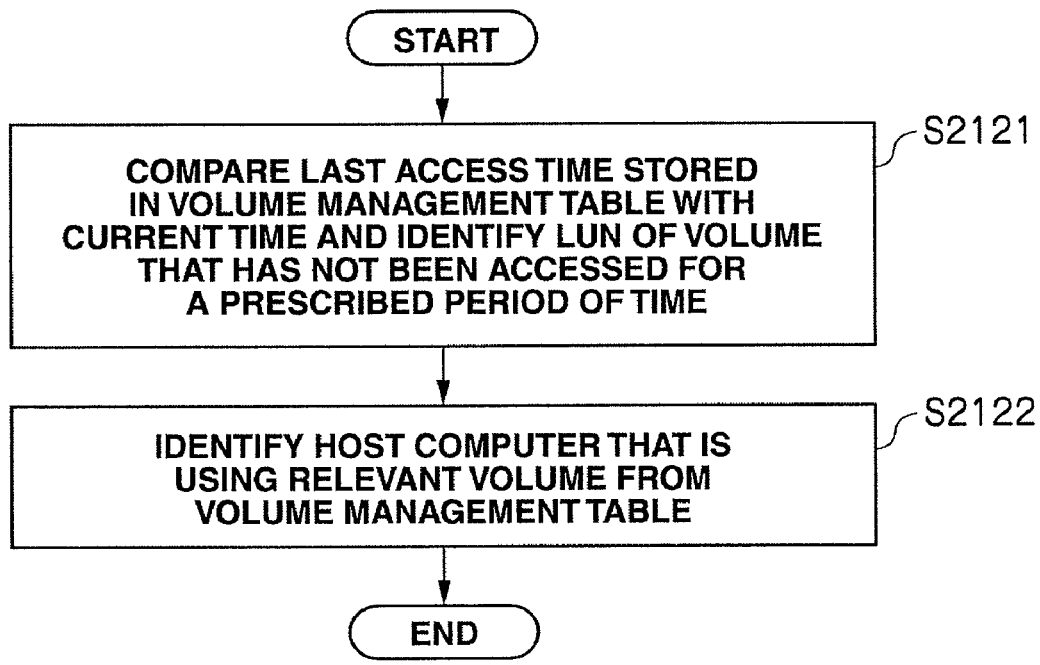
FIG. 23 is a sub-flowchart relating to the second embodiment.
Figure 24:
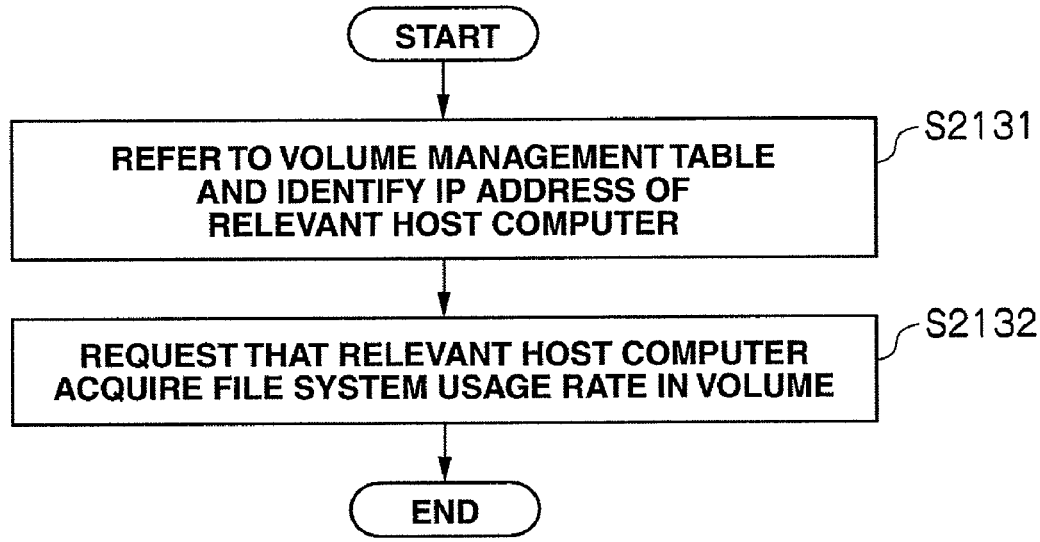
FIG. 24 is a sub-flowchart relating to the second embodiment.
Figure 25:
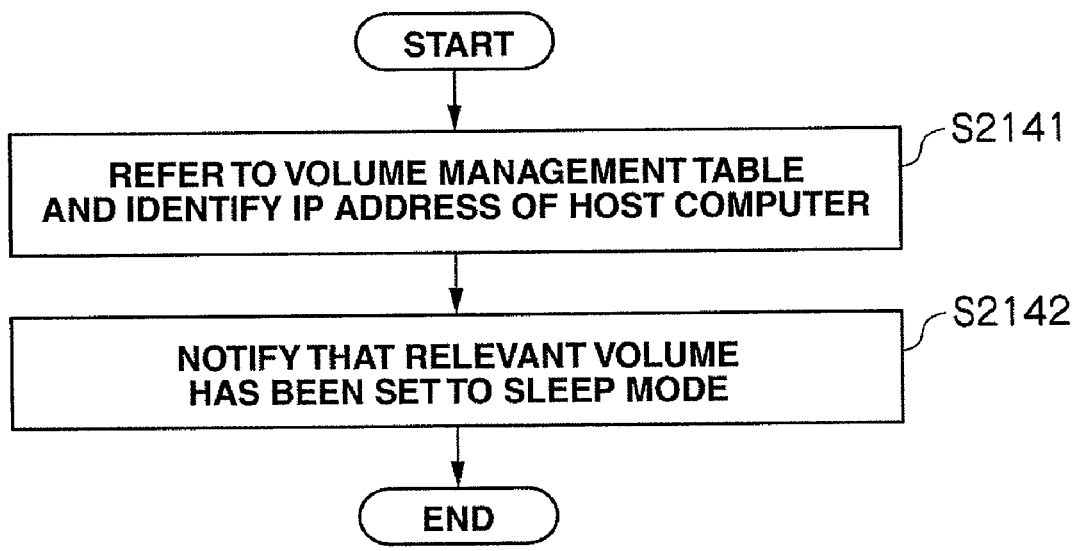
FIG. 25 is a sub-flowchart relating to the second embodiment.
Figure 26:
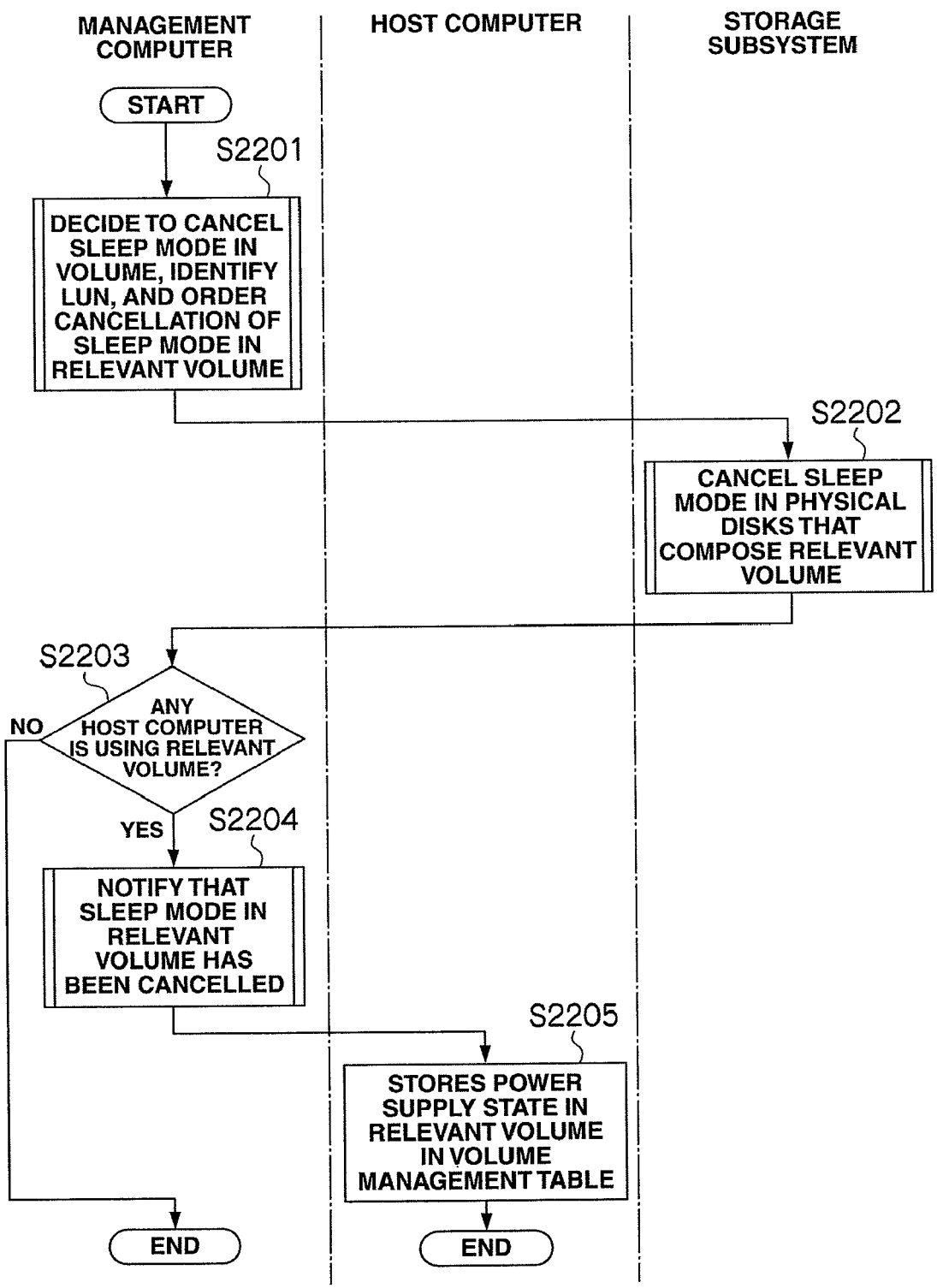
FIG. 26 is a flowchart showing the outline of a processing sequence followed by each device when cancelling the sleep mode in the volume in the second embodiment.
Figure 27:
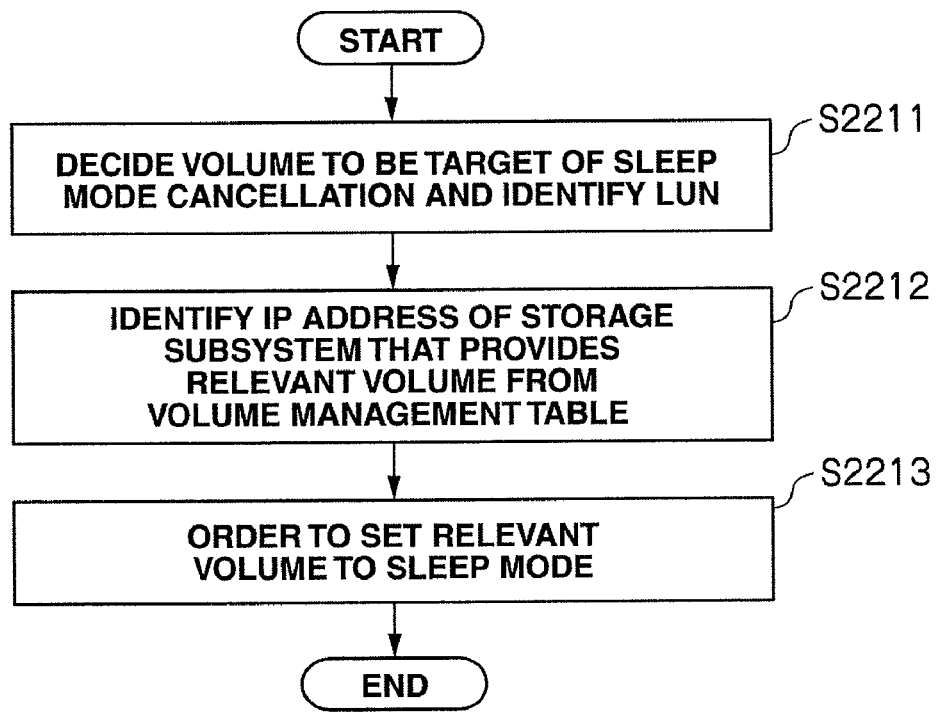
FIG. 27 is a sub-flowchart relating to the second embodiment.
Figure 28:
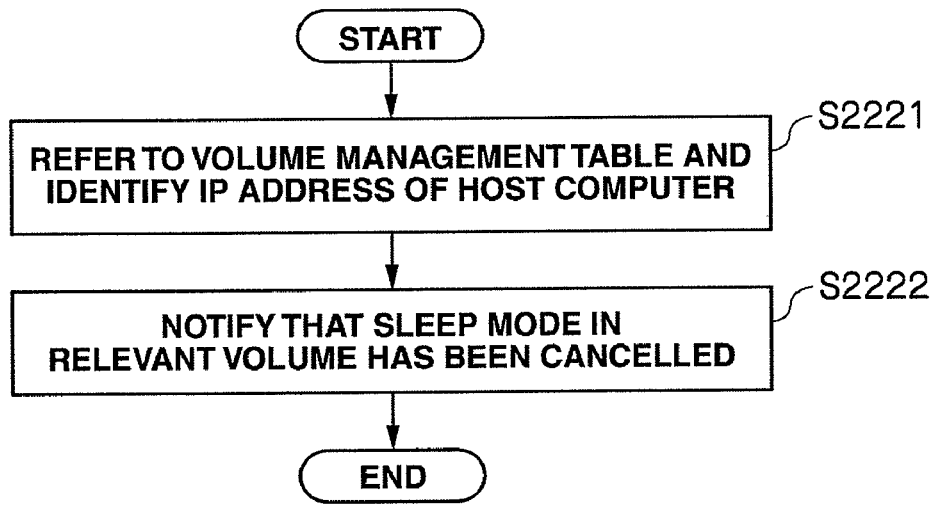
FIG. 28 is a sub-flowchart relating to the second embodiment.

FIGS. 22 and 26 are flowcharts showing the outline of a processing sequence followed by the management computer 200B, the host computer 100B, and the storage subsystem 300. FIGS. 23-25 are sub-flowcharts showing predetermined sequences in the processing sequence shown in FIG. 22, and FIGS. 27 and 28 are sub-flowcharts showing predetermined sequences in the processing sequence shown in FIG. 26.

FIG. 22 shows the sequences followed when setting the volume 330 in the storage subsystem 300 to sleep mode.

In step S2101, the CPU 210 in the management computer 200B identifies a logical volume in the volume 330 that has not been accessed from the host computer 100B for a predetermined period of time, and decides to set that logical volume in the volume 330 to sleep mode. The cause for setting the logical volume in the volume 330 to sleep mode is not limited to a lack of access to the volume 330 for a predetermined period of time.

The details of the processing in step S2101 are shown in the sub-flowchart in FIG. 23. In step S2121, the CPU 210 compares the last access time in the volume management table 222b with the current time and identifies the LUN of a logical volume that has not been accessed for a predetermined period of time. In step S2122, the CPU 210 identifies, from the volume management table 222b, the host computer that is using the logical volume. The volume that has not been accessed for a predetermined period of time is thus identified. The processing in step S2101 is performed as above.

Next, in step S2102, the CPU 210 checks whether or not any host computer 110B is using the logical volume. If a host computer 110B is using the logical volume (S2102: YES), the CPU 210 requests, in step S2103, that the host computer 100B acquire the file system usage rate in the volume.

The details of the processing in step S2103 are shown in the sub-flowchart in FIG. 24. In step S2131, the CPU 210 refers to the volume management table 222b and identifies the IP address of the host computer 110B. After that, the CPU 210 requests that the host computer 100B identified by the IP address acquire the file system usage rate in the logical volume. The file usage rate acquisition is requested by executing the processing in steps S2131 and S2132. The processing in step S2103 is performed as above.

After acquisition of the file system usage rate is requested, the CPU 110 in the host computer 100B executes, in step S2104, read access to the volume. Since that processing is the same as the processing in steps S1112 and S1113, its detailed explanation has omitted.

Next, in step S2105, the CPU 310 in the storage subsystem 300 executes read access to the physical disks 340 that form the volume based on the read access from the CPU 110 and acquires the file system information. The thus-acquired file system information is sent to the host computer 100B.

Next, in step S2106, the CPU 110 in the host computer 100B calculates the file system usage rate by using the file system information sent from the storage subsystem 300, and stores the thus-calculated value in the volume information table 122b. Since that processing is the same as the processing in step S1103, its detailed explanation has been omitted.

Next, in step S2107, the CPU 210 in the management computer 200B orders the storage subsystem 300 to set the power supply state in the logical volume to sleep mode. Since that processing is the same as the processing in step S1105, its detailed explanation has been omitted.

Next, in step S2108, the CPU 310 in the storage subsystem 300 sets the physical disks 340 that form the volume to sleep mode. Since that processing is same as the processing in step S1106, its detailed explanation has been omitted.

Next, in step S2109, the CPU 210 in the management computer 200B refers to the volume management table 222b and checks whether or not any host computer 100B is using the logical volume. If no host computer 100B is using the volume 330 (S2109: NO), the processing ends.

If a host computer 100B is using the volume 330 (S2109: YES), the CPU 210 in the management computer 200B notifies, in step S2110, the host computer 100B that the sleep mode in the volume has been cancelled.

The details of the processing in step S2110 are shown in the sub-flowchart in FIG. 25. In step S2141, the CPU 210 refers to the volume management table 222b and identifies the IP address of the host computer 100B. Then the CPU 210 notifies the host computer 100B with the thus identified IP address that the sleep mode in the volume has been set. The processing in step S2110 is performed as above.

Next, the CPU 110 in the host computer 100B, after receiving the notification, stores the power supply state in the logical volume in the volume information table 122b in step S2111. Since the processing in step S2211 is the same as the processing in step S1108, its detailed explanation has been omitted.

FIG. 26 shows a processing sequence executed when cancelling the sleep mode in the volumes 330 in the storage subsystem 300.

In step S2201, the CPU 210 in the management computer 200B decides to cancel the sleep mode in the volume 330, i.e., return the volume 330 to its regular power supply state, identifies the LUN of the logical volume in the volume 330, and orders cancellation of sleep mode in that logical volume. The cause for cancelling the sleep mode in the volume 330 is not expressly limited.

The details of the processing in step S2201 are shown in the flowchart in FIG. 27. In step S2211, the CPU 210 decides the logical volume in the volume 330 that will be the target of sleep mode cancellation. In step S2212, the CPU 210 acquires, from the volume management table 222b, the IP address of the storage subsystem that provides the volume 330. Then in step S2213, the CPU 210 orders the storage subsystem identified by the above acquired IP address to set the logical volume to sleep mode. The processing in step S2201 is performed as above.

Next, the CPU 310 in the storage subsystem 300, after receiving the order, cancels the sleep state of the logical volume. Since the processing in step S2202 is the same as the processing in step S1204, its detailed explanation has been omitted.

Next, in step S2203, the CPU 210 in the management computer 200B refers to the volume management table 222b and checks whether or not the logical volume is assigned to any host computer 100B. If the logical volume is not assigned to any host computer 100B (S2203: NO), the processing ends.

If the logical volume is assigned to a host computer 100B (S2203: YES), the CPU 210 in the management computer 200B notifies the host computer 100B that the sleep mode in the volume has been cancelled.

Figure 29:
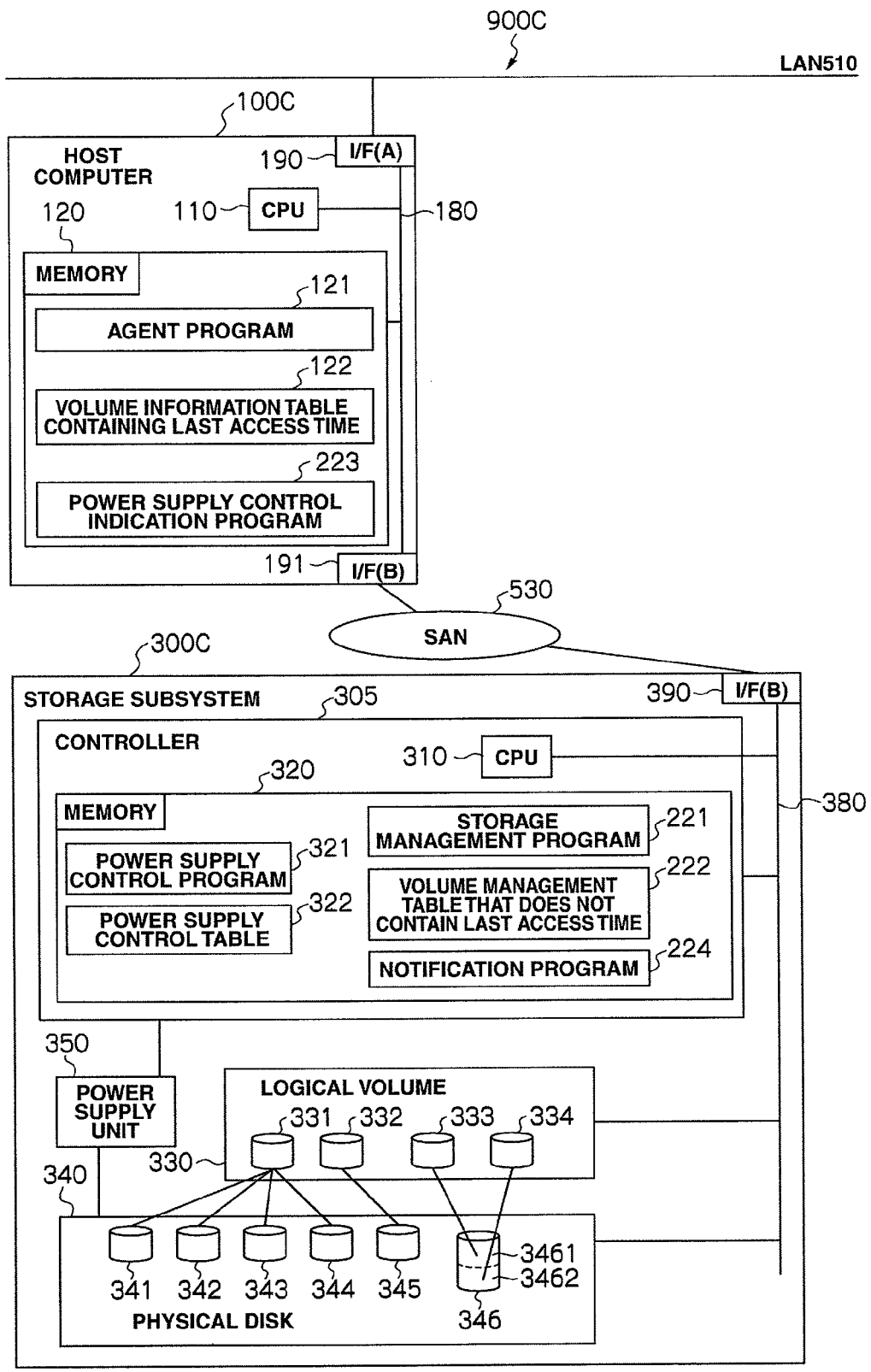
FIG. 29 is a diagram showing the configuration of a data processing system according to a third embodiment of the invention.

The details of the processing in step S2203 are shown in the sub-flowchart in FIG. 29. In step S2221, the CPU 210 refers to the volume management table 222b and identifies the IP address of the host computer 100B. In step S2222, the CPU 210 notifies the host computer 100B with the thus-identified IP address that the sleep mode in the volume has been cancelled. The processing in step S2203 is performed as above.

Next, in step S2204, the CPU 110 in the host computer 100B stores the power supply state in the logical volume in the volume information table 122b.

In the above described second embodiment, even when acquiring information concerning a logical volume in the volume 330, that logical volume is not accessed from the host computer 100B while the logical volume is in sleep mode. Accordingly, sleep mode in the volume 330 is not unnecessarily cancelled, and power consumption in the storage subsystem 300 can be controlled.

(3) Third Embodiment (3-1) System Configuration

FIG. 29 is a diagram illustrating a configuration of the data processing system 900C according to a third embodiment. The data processing system 900C includes one or more host computers 100C and storage subsystems 300C. Since most of the configuration of the data processing system 900C is the same as that of the data processing system 900 in the first embodiment, the same reference numbers are provided to the same components and its detailed explanation has been omitted. Only the difference between the data processing system 900C and the data processing system 900 will be described.

The difference between the data processing system 900 in FIG. 1 and the data processing system 900C is the feature that the data processing system 900C does not include the management computer 200 and the MN 520, and that the configuration of the host computer 100C and the storage subsystem 300C is different from that of the host computer 100 and the storage subsystem 300.

The difference between the host computers 100 and 100C is the feature that the host computer 100C has a power supply control indication program 223 in the memory 120.

The difference between the storage subsystems 300 and 300C is the feature that the storage subsystem 300C does not have an I/F (c) 391 for connection with the MN 520 and the notification indication program 323, but does have the storage management program 221, the volume management table 222 not containing the last access times, and the notification program 224.

(3-2) Explanation of Data Processing Sequence

Since most of the operations in the third embodiment are the same as those in the first embodiment, only the differences will be described below. In the first embodiment, the management computer 200 has the power supply control indication program 223, and the agent program 121 in the host computer 100 requests that the power supply control indication program 223 in the management computer 200 set the power supply state in the volume 330 to sleep mode, or to cancel sleep mode. Meanwhile, in the third embodiment, the host computer 100C has a power supply control indication program 123, and the power supply control indication program 123 orders the storage subsystem 300C to set the power supply state in the volume 330 to sleep mode or to cancel the sleep mode.

Figure 30:
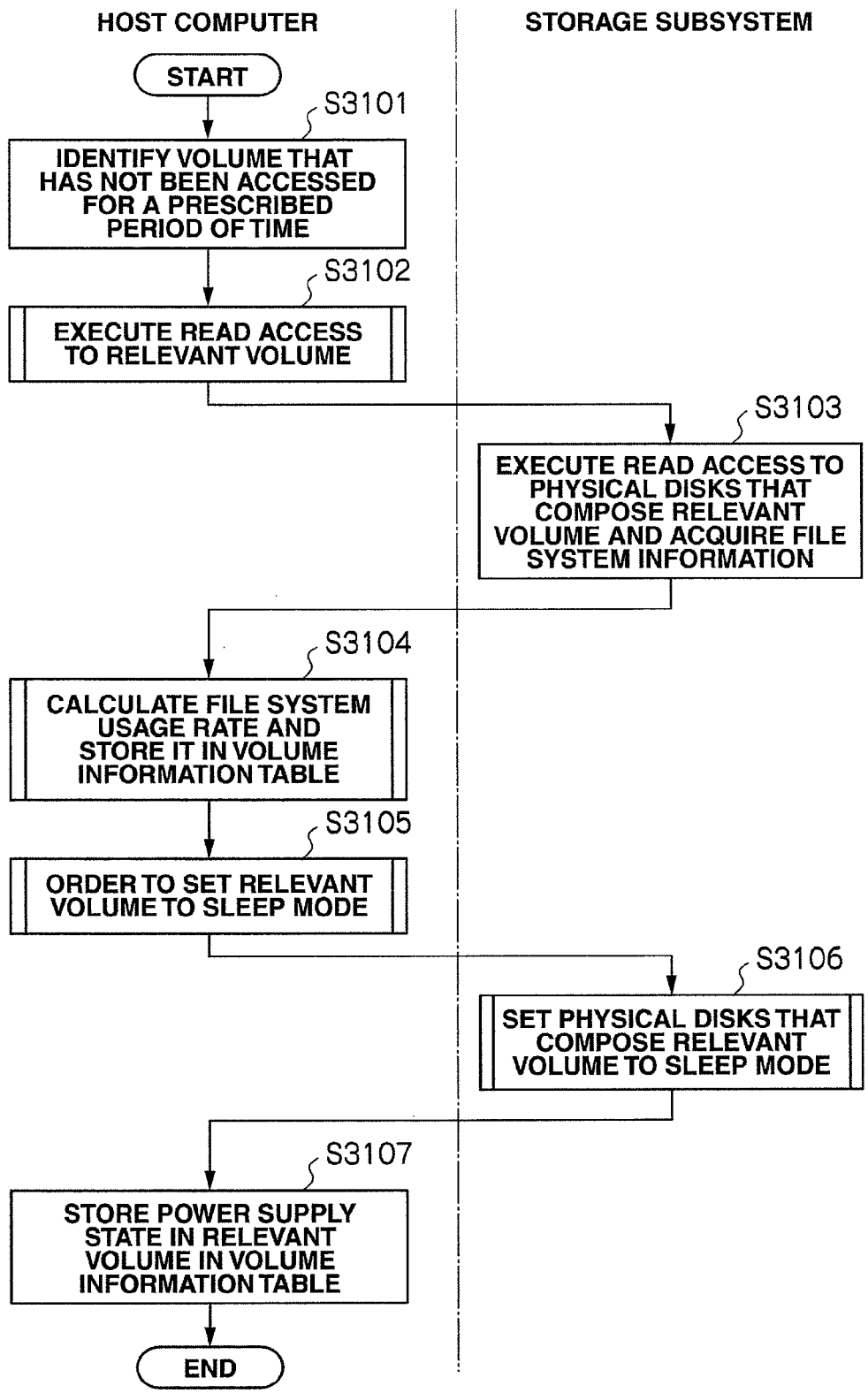
FIG. 30 is a flowchart showing the outline of a processing sequence followed by each device when setting the power supply state in a volume to sleep mode in the third embodiment.
Figure 31:
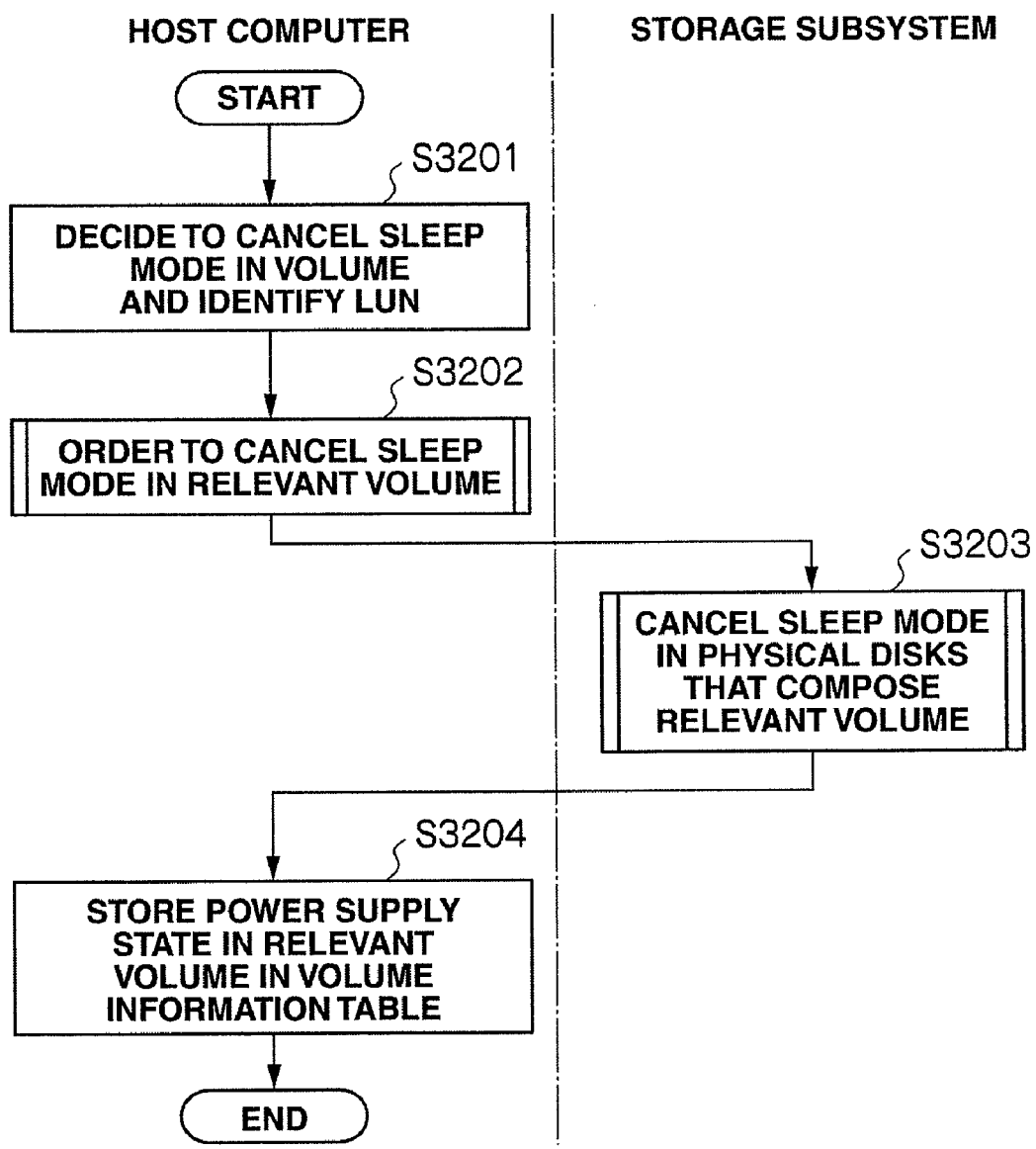
FIG. 31 is a flowchart showing the outline of a processing sequence followed by each device when cancelling the sleep mode in the volume in the third embodiment.

FIGS. 30 and 31 are flowcharts showing the outline of the processing sequence followed by the management computer, the host computer, and the storage subsystem.

FIG. 30 shows the outline of the processing sequence followed by each device when setting the power supply state in the volume 330 to sleep mode.

In step S3101, the CPU 110 in the host computer 100C identifies a logical volume in the volume 330 that has not been accessed for a predetermined period of time, and executes, in step S3102, read access to that logical volume in the volume 330. Since the processing in step S3102 is the same as the processing in steps S1112 and S1113, its detailed explanation has been omitted.

Next, in step S3103, the CPU 310 in the storage subsystem 300C executes read access to the physical disks that compose the logical volume. Since the processing in step S3103 is the same as the processing in step S1102, its detailed explanation has been omitted.

Next, in step S3104, the CPU 110 in the host computer 100C calculates the file system usage rate and stores it in the volume information table. Since the processing in step S3104 is the same as that in step S1103, its detailed explanation has been omitted.

Next, in step S3105, the CPU 110 orders the storage subsystem 300C to set the logical volume to sleep mode. Although there are some methods for ordering the storage subsystem 300C via the storage area network SAN 530, such as a method using an extended SCSI protocol or other dedicated protocols, the method used in this step is not expressly limited.

Next, in step S3106, the CPU 310 in the storage subsystem 300C sets the physical disks that compose the logical volume to sleep mode. Since the processing in step S3106 is the same as that in step S1106, its detailed explanation has been omitted. In step S3107, the CPU 110 in the host computer 100C stores the power supply state in the logical volume in the volume information table 122.

FIG. 31 shows the outline of the processing sequence followed by each device when cancelling sleep mode in the volume 330.

In step S3201, the CPU 110 in the host computer 100C cancels the sleep mode in a logical volume in the volume 330, identifies the LUN of that logical volume, and decides to return the logical volume to its regular power state. The cause for cancelling the sleep mode in the volume 330 is not expressly limited. In step S3202, the CPU 110 orders the storage subsystem 300C to cancel the sleep mode in the logical volume. Since the processing in step S3202 is the same as that in step S1203, its detailed explanation has been omitted.

Next, in step S3203, the CPU 310 in the storage subsystem 300C cancels the sleep mode in the physical disks that compose the logical volume. Since the processing in step S3203 is the same as that in step S1204, its detailed explanation has been omitted.

Next, the CPU 110 in the host computer 100C stores the power supply state in the logical volume in the volume information table 122.

In the above described third embodiment, even when acquiring the information concerning a logical volume in the volume 330, the volume 330 is not accessed from the host computer 100C while the volume is in sleep mode. Accordingly, power consumption in the storage subsystem 300C can be controlled.

(4) Fourth Embodiment (4-1) System Configuration

Figure 32:
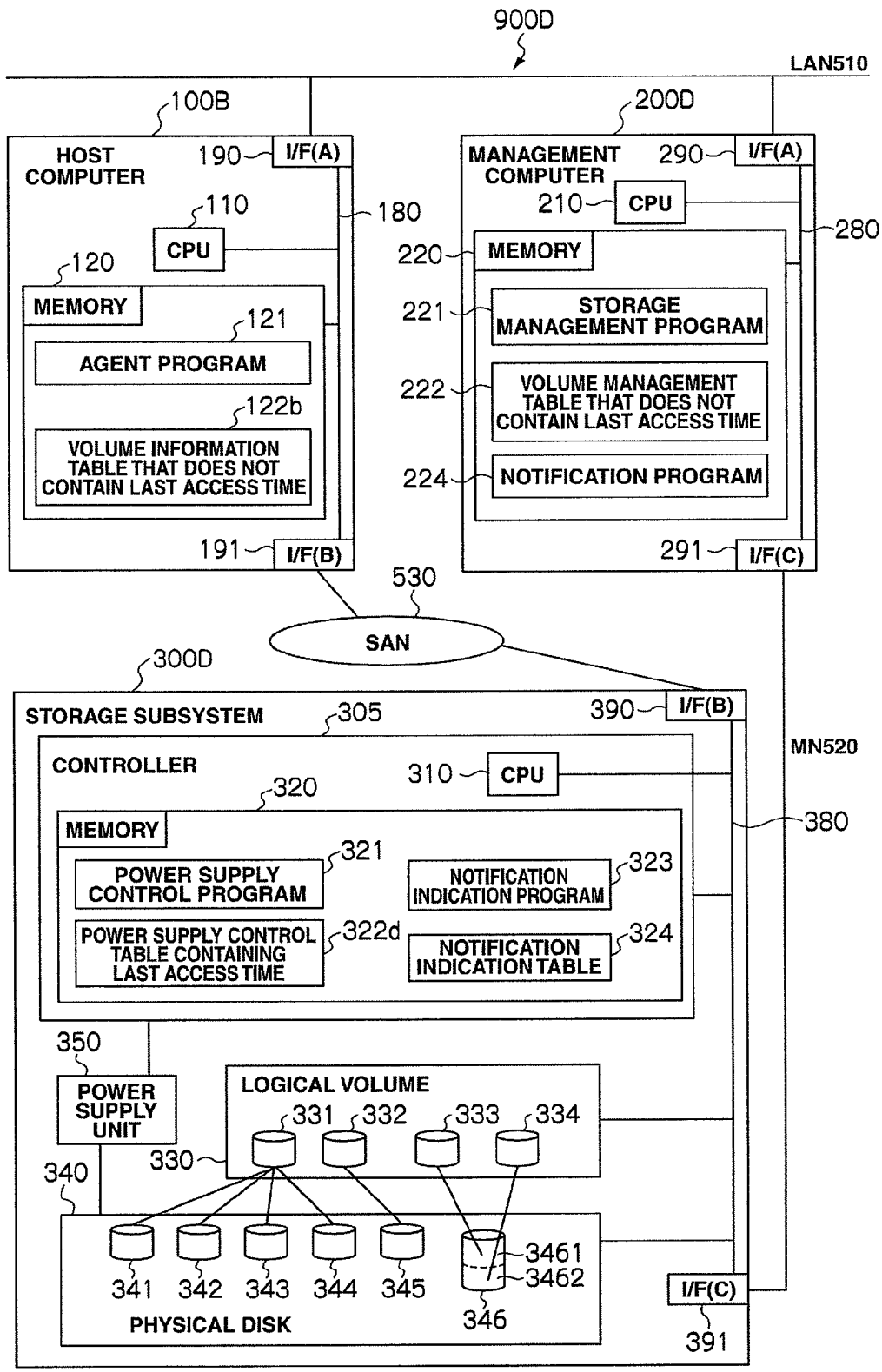
FIG. 32 is a diagram showing the configuration of a data processing system according to a fourth embodiment of the invention.

FIG. 32 is a diagram illustrating a configuration of the data processing system 900D according to a fourth embodiment of the invention. The data processing system 900D includes one or more host computers 100B, management computers 200D, and storage subsystems 300D. Since most of the configuration of the data processing system 900D is the same as that of the data processing system 900B in the second embodiment, the same reference numbers are provided to the same components and its detailed explanation has been omitted. Only the differences between the data processing systems 900D and 900B will be described below.

The difference between the data processing system 900B shown in FIG. 19 and the data processing system 900D is the feature that the management computer 200D does not have the power supply control indication program 223 in the memory 220, but does have the volume management table 222 not containing the last access times in the memory 220, and the storage subsystem 300D has the power supply control table 322d containing the last access times, the notification indication program 323, and the notification indication table 324 in the memory 320.

The difference between the power supply control table 322 shown in FIG. 4 and the power supply control table 322d containing the last access times shown in FIG. 33 is only the feature that the power supply control table 322d contains the time 3224d of last access from the host computer 100B to the volume 330.

The notification indication program 323 is a program executed by the CPU 310 in the notification indication program 323, and is designed to request that the management computer 200D order the host computer 100B to acquire the file system usage rate in the volume and notify the host computer 100B of the change in power supply state.

As shown in FIG. 34, the notification indication table 324 contains entries for the LUNs (Logical Unit Numbers) 3240, which are ID numbers of logical volumes the volumes 330 and the IP addresses 3241 of the management computers 200D that manage the volumes 330. Although in this embodiment the IP addresses 3241 are stored by the storage management program 221 in the management computer 200D when creating a storage volume in the storage subsystem 300D, the method of storing the IP address is not limited to the above.

(4-2) Explanation of Data Processing Sequence

Since most of the operations in this embodiment are the same as those in the second embodiment, only the differences will be described below. In the second embodiment, the storage management program 221 in the management computer 200 decides when to set/cancel the sleep mode in the volume 330. Meanwhile, in this embodiment, the power supply control program 321 in the storage subsystem 300D decides when to set/cancel the sleep mode.

Figure 35:
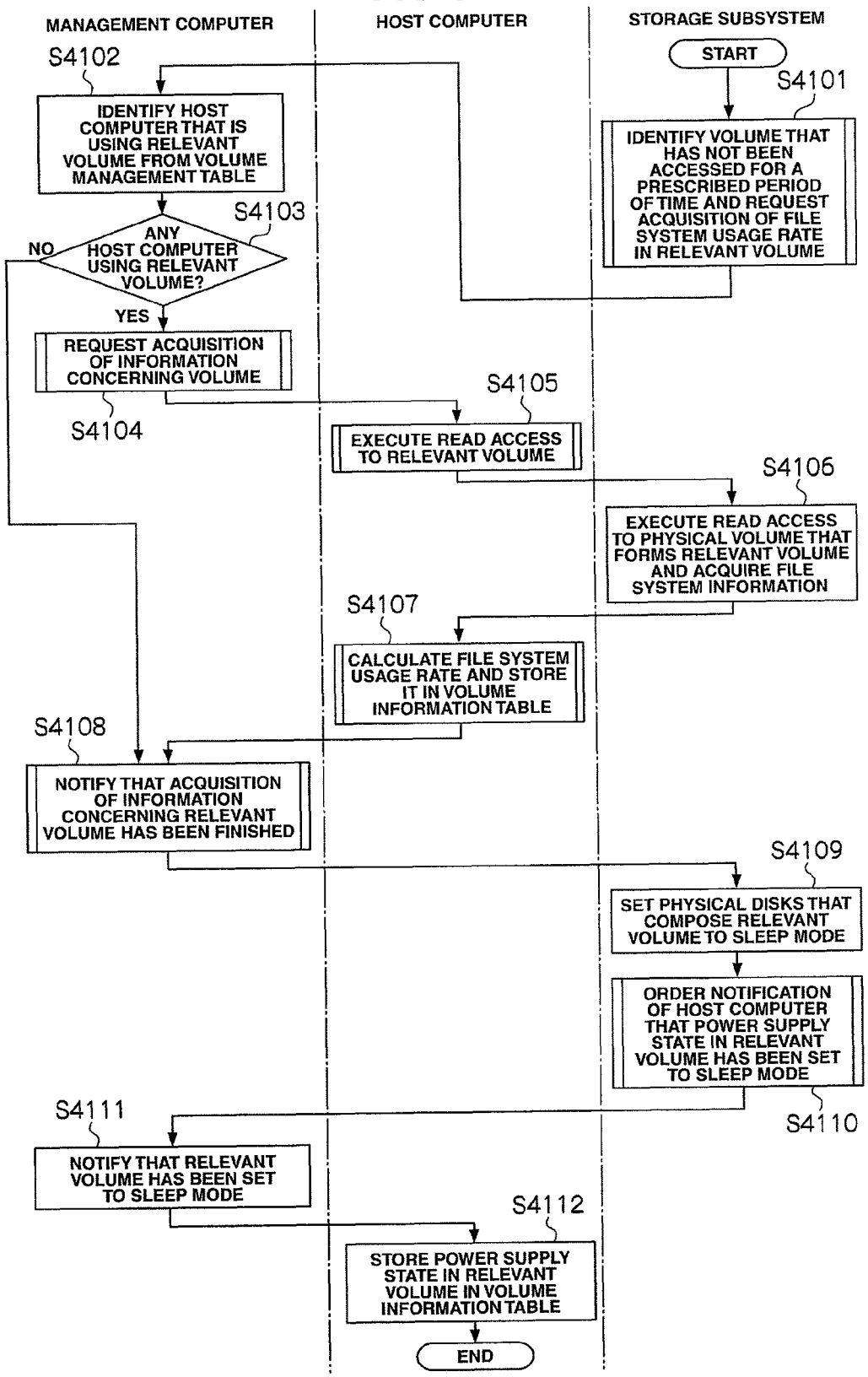
FIG. 35 is a flowchart showing the outline of a processing sequence followed by each device when setting the power supply state in a volume to sleep mode in the fourth embodiment.
Figure 36:
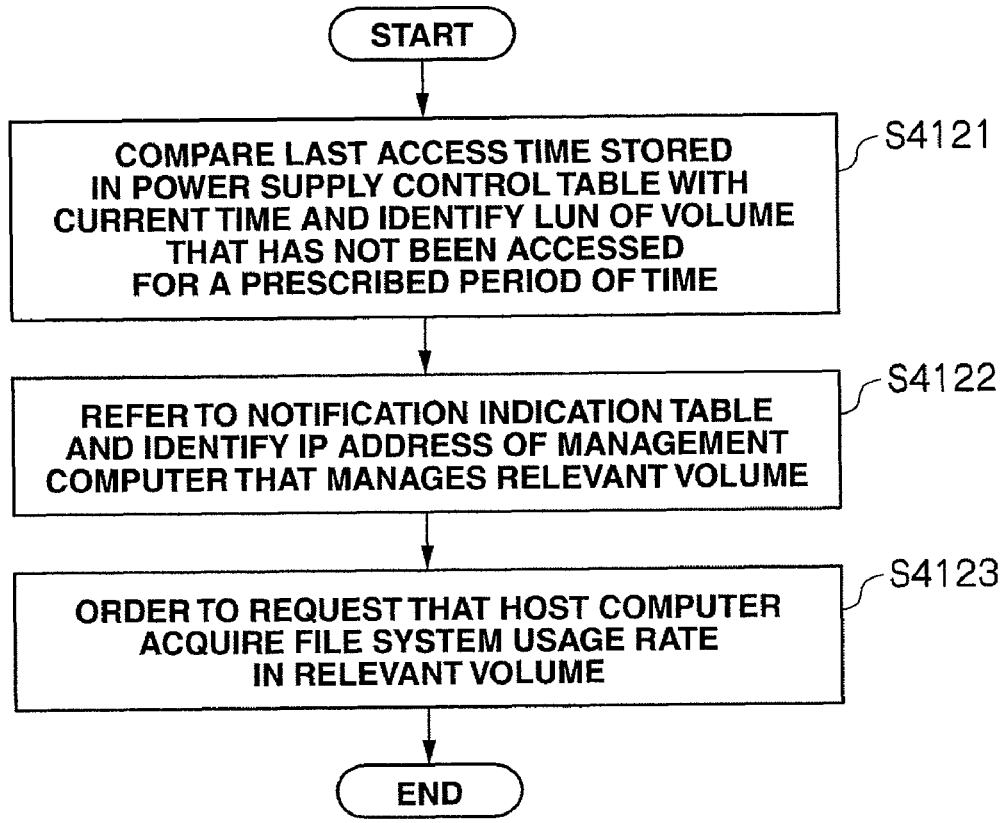
FIG. 36 is a sub-flowchart relating to the fourth embodiment.
Figure 37:
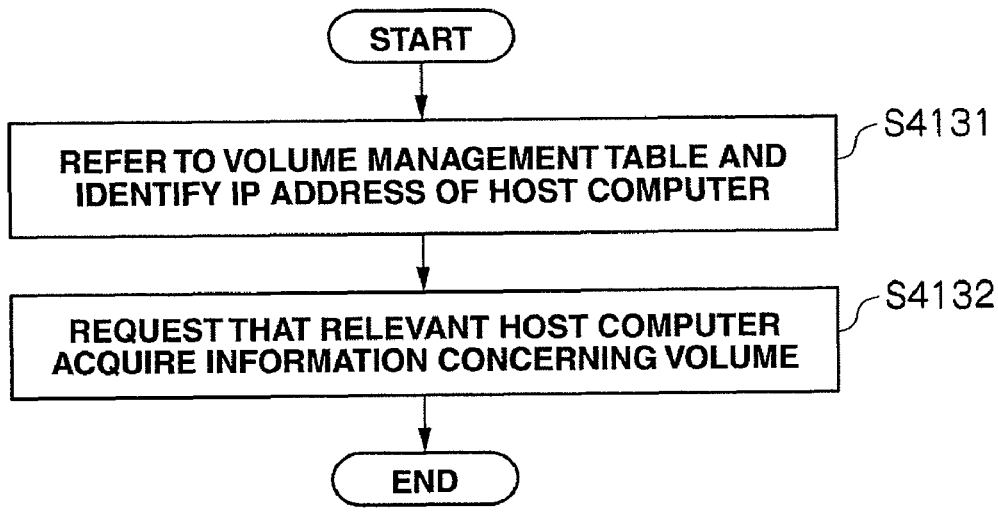
FIG. 37 is a sub-flowchart relating to the fourth embodiment.
Figure 38:
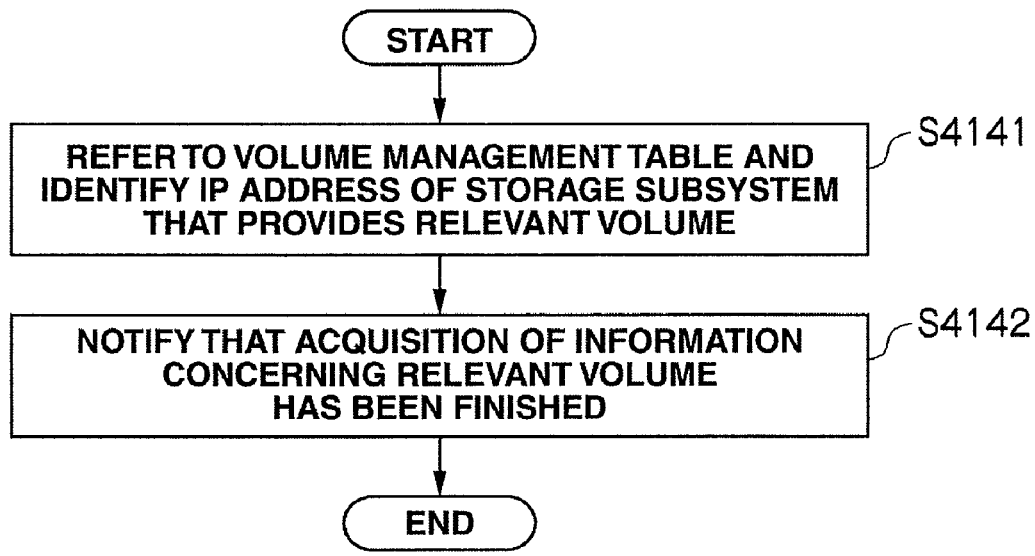
FIG. 38 is a sub-flowchart relating to the fourth embodiment.
Figure 39:
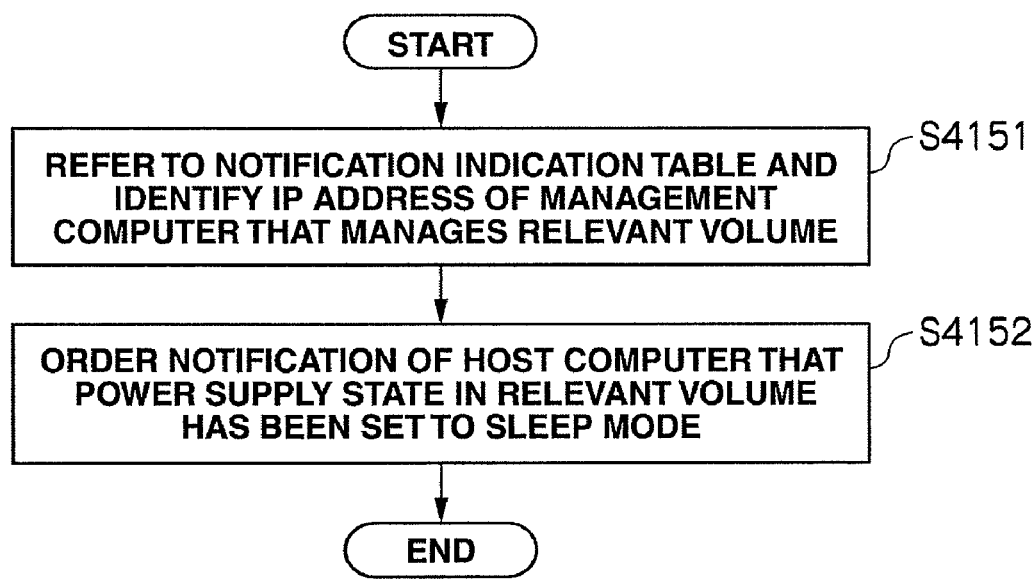
FIG. 39 is a sub-flowchart relating to the fourth embodiment.
Figure 40:
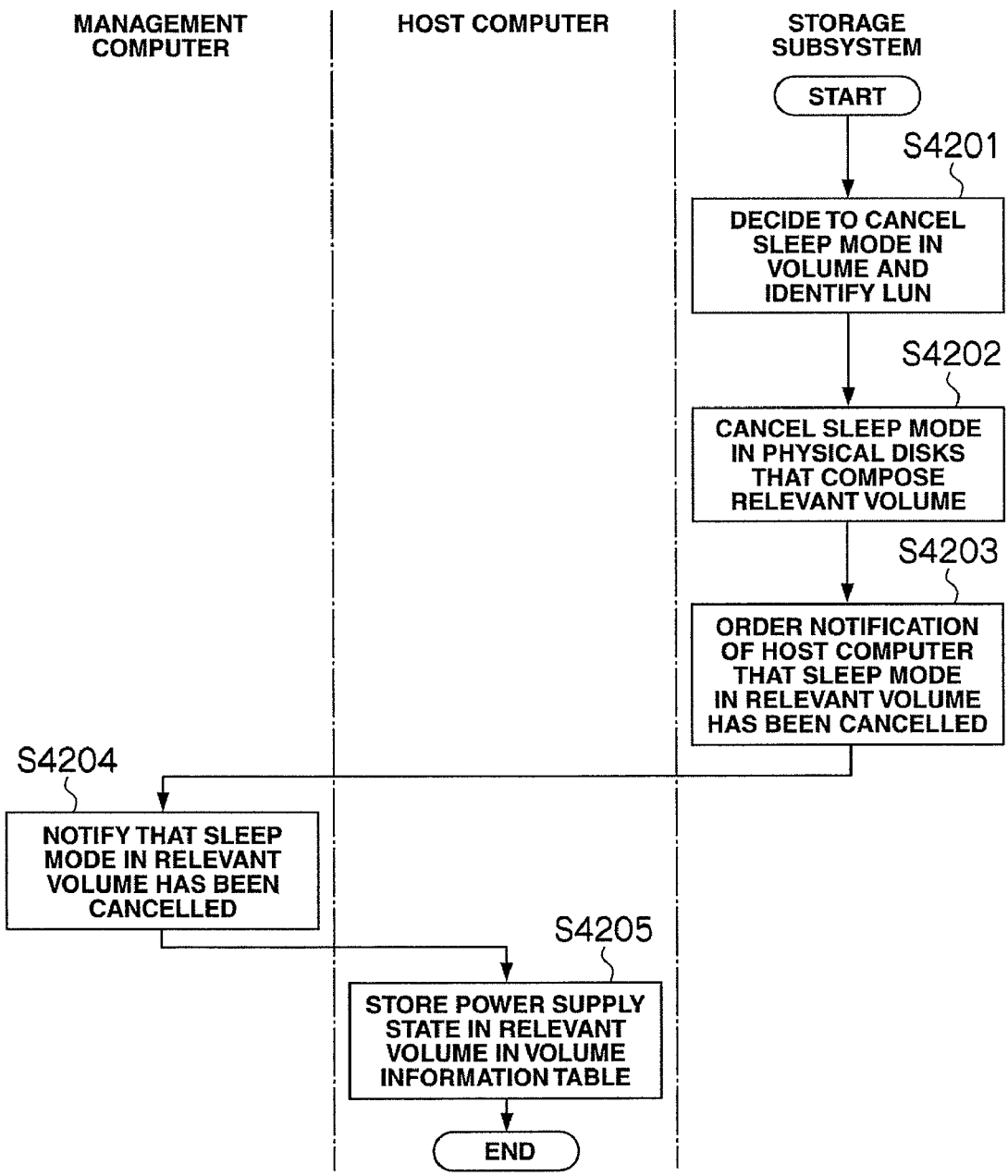
FIG. 40 is a flowchart showing the outline of a processing sequence followed by each device when cancelling the sleep mode in the volume in the fourth embodiment.

FIGS. 35 and 40 are flowcharts showing the outline of processing sequence followed by the management computer, the host computer, and the storage subsystem. FIGS. 36-39 are sub-flowcharts showing predetermined sequences in the processing sequence shown in FIG. 35 in detail.

FIG. 35 shows the outline of the processing sequence followed by each device when setting the power supply state in the volume 330 to sleep mode.

In step S4101, the CPU 310 in the storage subsystem 300D executes the power supply control program 321, identifies a volume that has not been accessed for a predetermined period of time, and requests the file system usage rate in that volume. The detail of that processing is shown in the sub-flowchart in FIG. 36. In step S4121, the CPU 310 compares the last access time stored in the power supply control table with the current time and identifies the volume that has not been accessed for a predetermined period of time. In step S4122, the CPU 310 refers to the notification indication table and identifies the IP address in the management computer that manages the volume 330. In step S4123, the CPU 310 orders a request to the host computer 100D to acquire the file system usage rate in the logical volume. The processing in step S4101 is performed as above.

Next, in step S4102, the CPU 210 in the management computer 200D identifies, from the volume management table 222, the host computer that is using the logical volume based on the order from the storage subsystem 300D.

Next, in step S4103, the CPU 210 checks whether or not any host computer is using the logical volume. If it is judged that no host computer is using the logical volume (S4103: NO), the processings proceeds to step S4108.

Meanwhile, if the CPU 210 judges that a host computer is using the logical volume (S4103: YES), the CPU 210 requests, in step S4104, that the host computer 100B acquire information concerning the volume. The detail of the processing in step S4104 is shown in the sub-flowchart in FIG. 37. In step S4131, the CPU 210 refers to the volume management table 222 and identifies the host computer IP address, and requests that the thus-identified host computer acquire the information concerning the volume. The processing in step S4104 is performed as above.

Next, in step S4105, the CPU 110 in the host computer 100B executes read access to the logical volume. In step S4106, the CPU 310 in the storage subsystem 300D executes read access to the physical disks that compose the logical volume and acquires the file system information. The CPU 110 in the host computer 100B then calculates the file system usage rate and stores it in the volume information table 122b. Since the processing in steps S4105-S4106 is the same as that in steps S2104-S2106, its detailed explanation has been omitted.

Next, in step S4108, the CPU 210 in the management computer 200D gives notification that the acquisition of information concerning the logical volume has been finished. The detail of the processing in step S4108 is shown in the sub-flowchart in FIG. 38. In step S4141, the CPU 210 refers to the volume management table 222 and identifies the IP address of the storage subsystem that manages the volume. In step S4142, the CPU 210 notifies the storage subsystem 300D that acquisition of information concerning the volume has been finished. The processing in step S4108 is performed as above.

Next, in step S4109, the CPU 310 in the storage subsystem 300D sets the physical disks that compose the volume to sleep mode. Since the processing in step 4109 is the same as that in step S2108, its detailed explanation has been omitted.

Next, in step S4110, the CPU 310 orders notification of the host computer 100B that the power supply state in the logical volume has been set to sleep mode. The details of the processing in step S4110 are shown in the sub-flowchart in FIG. 39. In step S4151, the CPU 310 refers to the notification indication table 324 and identifies the IP address of the management computer 200D that manages the volume. In step S4152, the CPU 310 orders the management computer 200D to notify the host computer 100B that the volume power supply state has been set to sleep mode. The processing in step S4110 is performed as above.

Next, in step S4111, the CPU 210 in the management computer 200D notifies the host computer 100B that the volume has been set to sleep mode.

Next, in step S4112, the CPU 110 in the host computer 100B stores the power supply state in the volume in the volume information table 122b.

FIG. 40 shows the outline of the processing sequence followed by each device when cancelling the sleep mode in the volume 330.

In step S4201, the CPU 310 in the storage subsystem 300D executes the power supply control program 321, decides to cancel the sleep mode in a logical volume in the volume 330, and identifies the LUN. Next, in step S4202, the CPU 310 cancels the sleep mode in the physical disks that compose the relevant logical volume in the volume 330. In step S4203, the CPU 310 orders the management computer 200D to notify the host computer 100B that the sleep mode in the volume has been cancelled.

Next, in step S4204, the CPU 210 in the management computer 200D, after receiving the notification from the storage subsystem 300D in step S4203, notifies the host computer 100B that the sleep mode in the volume has been cancelled.

Next, in step S4205, the CPU 110 in the host computer 100B, after receiving the notification from the management computer 200D in step S4204, stores the power supply state in the logical volume in the volume information table 122b.

In the above described fourth embodiment, even when acquiring information concerning a logical volume in the volume 330, the volume 330 is not accessed from the host computer 100B while the volume is in sleep mode. Accordingly, the sleep mode in the volume 330 is not unnecessarily cancelled, and power consumption in the storage subsystem 300D can be controlled.

(5) Fifth Embodiment (5-1) System Configuration

Figure 41:
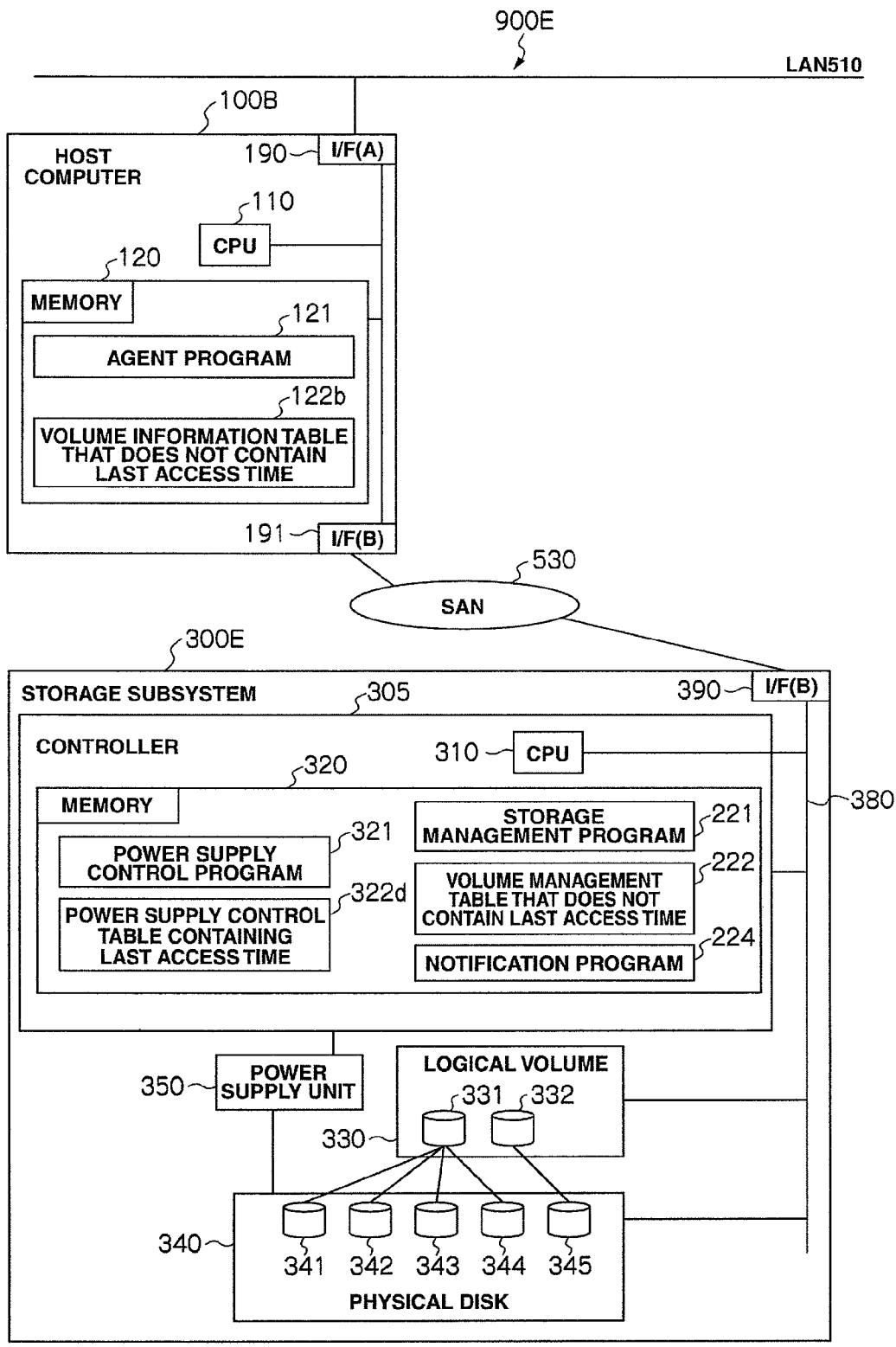
FIG. 41 is a diagram showing the configuration of a data processing system according to a fifth embodiment of the invention.

FIG. 41 is a diagram illustrating a configuration of the data processing system 900E according to a fifth embodiment. The data processing system 900E includes one or more host computers 100B and storage subsystems 300E. Since most of the configuration of the data processing system 900E is the same as that of the data processing system 900D in the fourth embodiment, the same reference numbers are provided to the same components, and its detailed explanation has been omitted. Only the differences between the data processing systems 900E and 900D will be described below.

The difference between the data processing system 900D shown in FIG. 32 and the data processing system 900E is the feature that the data processing system 900E does not include the management computer 200D and the MN 520, and that the configuration of the storage subsystem 300E is different from that of the storage subsystem 300D.

The difference between the storage subsystems 300E and 300D is the feature that the storage subsystem 300E does not have the I/F (C) 391 for connection with the MN 520 and the notification indication program 323, but does have the storage management program 221, the volume management table 222 not containing the last access times, and the notification program 224.

(5-2) Explanation of Data Processing Sequence

Since most of the operations in this embodiment are the same as those in the fourth embodiment, only the differences will be described below. In the fourth embodiment, the management computer 200C has the storage management program 200C, the volume management table 222C, and the notification program 224, and notifies the host computer 100B of the change in the power supply state in the volume. Meanwhile, in the fifth embodiment, the storage subsystem 300E has the storage management program 221, the volume management table 222, and the notification program 224, and notifies the host computer 100B of the change in the power supply state in the volume.

Figure 42:
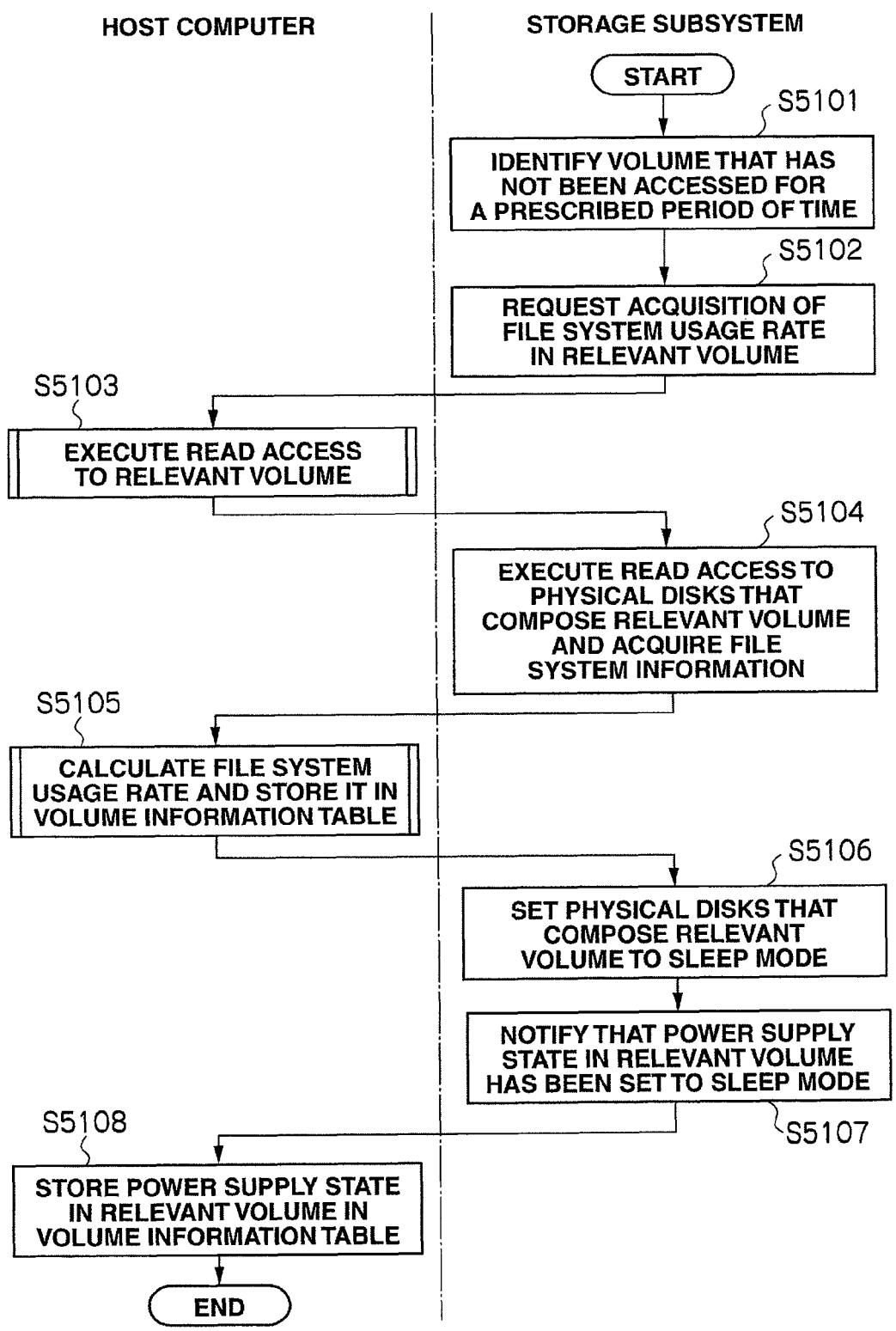
FIG. 42 is a flowchart showing the outline of a processing sequence followed by each device when setting the power supply state in a volume to sleep mode in the fifth embodiment.
Figure 43:
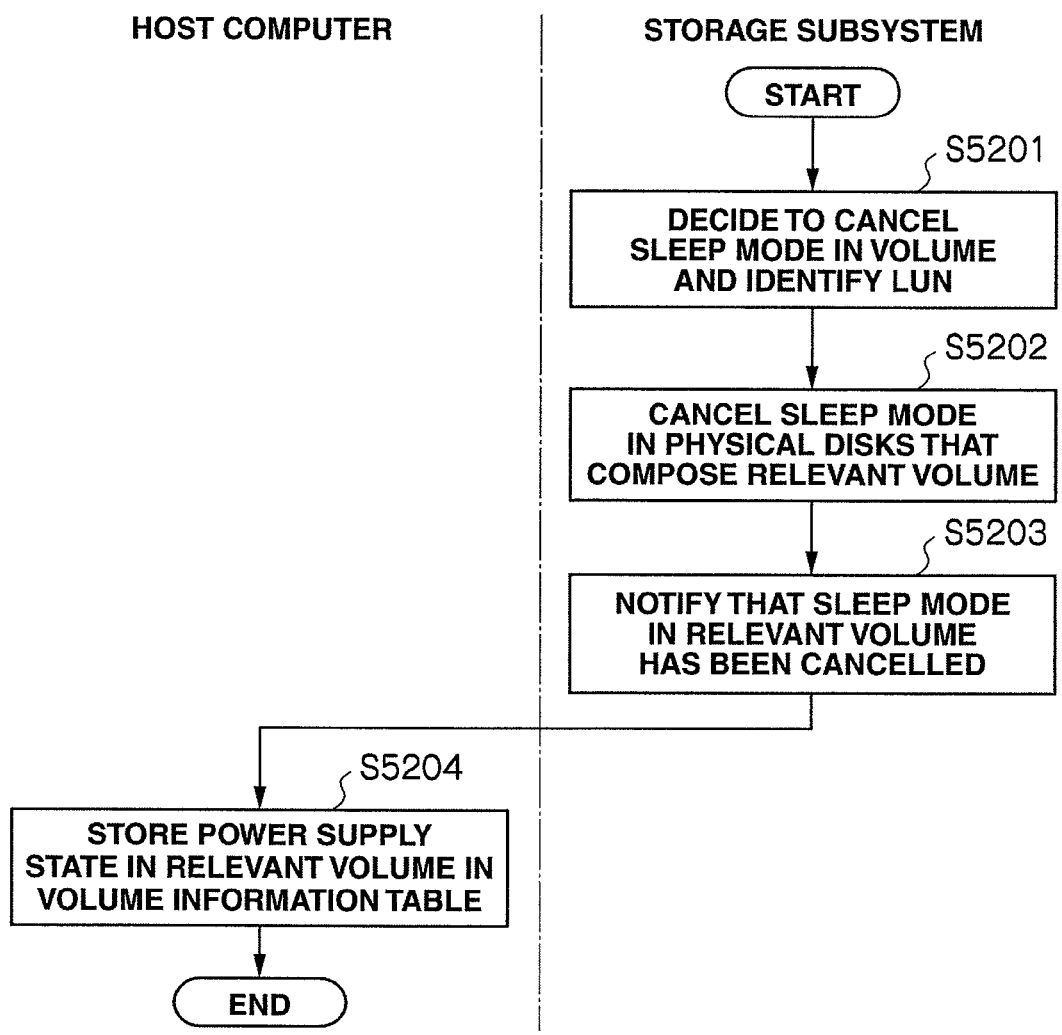
FIG. 43 is a flowchart showing the outline of a processing sequence followed by each device when cancelling the volume sleep mode in the fifth embodiment.

FIGS. 42 and 43 are flowcharts showing the outline of a processing sequence followed by the host computer 100B and the storage subsystem 300E.

FIG. 42 shows the outline of the processing sequence followed by each device when setting the power supply state in the volume 330 to sleep mode.

In step S5101, the CPU 310 in the storage subsystem 300E identifies a logical volume in the volume 330 that has not been accessed from the host computer 100B for a predetermined period of time.

In step S5102, the CPU 310 requests that the host computer 100B acquire the file system usage rate in the relevant logical volume in the volume 330. As is the case in the third embodiment, the method for making the request via the storage area network SAN 530 is not expressly limited.

Next, in step S5103, the CPU 110 in the host computer 100B executes read access to the logical volume. In step S5104, the CPU 310 in the storage subsystem 300E executes read access to the physical disks that compose the logical volume and acquires the file system information. The CPU 110 in the host computer 100B then calculates the file system usage rate and stores it in the volume information table 122b. In step S5106, the CPU 310 in the storage subsystem 300E sets the physical disks that compose the volume to sleep mode. Since the processing in steps S5103-S5106 is the same as that in steps S4105-S4107 and S4109, its detailed explanation has been omitted.

Next, in step S5107, the CPU 310 notifies the host computer 100B that the power supply state in the logical volume has been set to sleep mode. The method for sending the notification via the SAN 530 is not expressly limited.

Next, in step S5108, the CPU 110 in the host computer 100B, after receiving the notification in step S5107, stores the power supply state in the volume in the volume information table 122b.

FIG. 43 shows the outline of the processing sequence followed by each device when cancelling the sleep mode in the volume 330.

In step S5201, the CPU 310 in the storage subsystem 300E executes the power supply control program 321, decides to cancel the sleep mode in a logical volume in the volume 330, and identifies the LUN. Next, in step S5202, the CPU 310 cancels the sleep mode in the physical disks that compose the logical volume. In step S5203, the CPU 310 notifies the host computer 100B that sleep mode in the volume has been cancelled.

Next, in step S5204, the CPU 110 in the host computer 100B, after receiving the notification from the storage subsystem 300E in step S5203, stores the power supply state in the volume in the volume information table 122b.

In the above described fifth embodiment, even when acquiring the information concerning a logical volume in the volume 330, the volume 330 is not accessed while that volume is in sleep mode. Accordingly, the sleep mode in the volume 330 is not unnecessarily cancelled, and power consumption in the storage subsystem 300E can be controlled.

In the first embodiment, even when acquiring information concerning the volumes from the storage subsystem 300, the host computer 100 does not access the storage subsystem 300 while the volume 330 is in sleep mode. Accordingly, the processing in the management computer 200 can be reduced, and traffic in the SAN 530 can also be reduced. In the second to fifth embodiments, too, traffic in the SAN 530 can be reduced as in the first embodiment.

In the above described embodiments, the storage system in this invention is applied to the data processing system 900A configured as shown in FIG. 1, the data processing system 900B configured as shown in FIG. 19, the data processing system 900C configured as shown in FIG. 29, the data processing system 900D configured as shown in FIG. 32, and the data processing system 900E configured as shown in FIG. 41. However, the present invention can be used not only in those data processing systems but also in storage systems with various other configurations.

For example, in the first embodiment, the data processing system 900A includes: the storage subsystem 300 having one or more physical disk(s) 340, the volume 330 composed of the one or more physical disk(s) 340, and the power supply control unit (the CPU 310 for executing the power supply control program 321) for controlling the power supply state in the physical disk(s) 340; the host computer 100 having the volume 330 assigned from the storage subsystem 330 and the monitor (the CPU 110 for executing the agent program 121) for acquiring information for management of the volume 330; and the management computer 200 having the power supply control indication unit (the CPU 210 for executing the power supply control indication program 223) for ordering the power supply control unit to change the power supply state in the physical device(s) 340 to 'on' or another state and the notification unit (the CPU 210 for executing the notification program 224) for notifying the host computer 100 of the change of the power supply state in the physical disk(s)s 340. In the above described data processing system 900A, the monitor checks, when acquiring information indicating the file system usage rate for management of the volume 330, whether or not the power supply state in the volume 330 is 'on,' and acquires the second information indicating the file system usage rate from the volume 330 if the power supply state is 'on,' or acquires the second information indicating the file system usage rate stored in the volume information table 122 if the power supply state is not 'on'. However, the invention is not limited to that example.

For example, in the third embodiment, the data processing system 900C includes: the storage subsystem 300C having one or more physical disk(s) 340, the volume 330 composed of the one or more physical disk(s) 340, and the power supply control unit (the CPU 310 for executing the power supply control program 321) for controlling the power supply state in the physical disk(s) 340; and the host computer 100C having the volume 330 assigned from the storage subsystem 300C, the monitor (the CPU 110 for executing the agent program 121) for acquiring information for management of the assigned volume 330, and the power supply control indication unit (the CPU 110 for executing the power supply control indication program 223) for ordering the power supply control unit to change the power supply state in the physical device(s) 340 to 'on' or another state. In that data processing system 900C, the host computer 100C has the volume information table 122 that stores the first information indicating the power supply state, i.e., whether or not the power supply state in the volume 330 is 'on,' and the second information indicating the file system usage rate in the volume 330, and the monitor acquires, when acquiring information for management of the volume 330, the second information indicating the file system usage rate from the volume 330 if the power supply state in the volume 330 is 'on,' or acquires the second information indicating the file system usage rate in the volume 330 stored in the volume information table 122 if the power supply state in the volume 330 is 'off'. However, the invention is not limited to that example.

The present invention can be widely applied in various kinds of storage systems.

What is claimed is:

1. A storage system comprising:
a storage subsystem including one or more physical device (s), a storage region composed of at least a portion of the one or more physical device(s), and a power supply control unit for controlling the state of power supply in the physical device(s);
a host computer including an assigned storage region assigned from the storage subsystem, and a monitor for acquiring information for management of the assigned storage region; and
a management computer including a power supply control indication unit for ordering the power supply control unit to change the power supply state in the physical device(s) to 'on' or another state, and a notification unit for notifying the host computer of the shift in the power supply state in the physical device(s),
wherein the host computer has a storage region information table that stores first information indicating the power supply state, including whether or not the power supply state in the storage region is 'on,' and second information detailing a usage measurement concerning the storage region, and
wherein the monitor acquires, when acquiring the information for management of the storage region, the second information detailing the usage measurement from the storage region if the power supply state in the storage region is 'on,' or acquires the second information stored in the storage region information table if the power supply state in the storage region is not 'on'.

2. The storage system according to claim 1, wherein the information concerning the storage region is a file system usage rate.

3. The storage system according to claim 1, wherein if the power supply state is not 'on,' the power supply state is 'off' or in 'suspended' mode.

4. The storage system according to claim 1, wherein the monitor requests that the power supply control indication unit set the power supply state in the storage region to a state other than 'on' after performing I/O access to the storage region to acquire the second information and storing the second information in the storage region information table, and the power supply control indication unit orders the power supply control unit to set the power supply state in the storage region to a state other than 'on' based on the request.

5. The storage system according to claim 1 wherein the notification unit notifies the monitor of the order before the power supply control indication unit orders the power supply control unit to set the power supply state in the storage region to a state other than 'on,' and the monitor, after receiving the notification, executes I/O access to the storage region to acquire the second information and stores the second information in the storage region information table.

6. The storage system according to claim 1, wherein the storage subsystem includes a notification delegating unit for requesting notification to the host computer of the change in the power supply state in the storage region, and the notification delegating unit requests, before setting the power supply state in the storage region to a state other than 'on,' that the notification unit notify the host computer of the setting, and the monitor executes I/O access to the storage region to acquire the second information and stores the second information in the storage region information table.

7. The storage system according to claim 1, wherein the second information detailing a usage measurement concerning the storage region, is more particularly usage rate information, and wherein the second information stored in the storage region information table is more particularly most-recently-stored usage rate information.

8. A storage system comprising:
a storage subsystem including one or more physical device(s), a storage region composed of at least a portion of the one or more physical device(s), and a power supply control unit for controlling the state of power supply in the physical device(s);
a host computer including an assigned storage region assigned from the storage subsystem, and a monitor for acquiring information for management of the assigned storage region; and
a management computer including a power supply control indication unit for ordering the power supply control unit to change the power supply state in the physical device(s) to 'on' or another state, and a notification unit for notifying the host computer of the shift in the power supply state in the physical device(s),
wherein the host computer has a storage region information table that stores first information indicating the power supply state, including whether or not the power supply state in the storage region is 'on,' and second information concerning the storage region,
wherein the monitor acquires, when acquiring the information for management of the storage region, the second information from the storage region if the power supply state in the storage region is 'on,' or acquires the second information stored in the storage region information table if the power supply state in the storage region is not 'on', and
wherein the storage region information table contains not only the power supply state in the storage region but also the power supply state in the control unit for controlling the storage region.

9. A storage system comprising:
a storage subsystem including one or more physical device(s), a storage region composed of at least a portion of the one or more physical device(s), and a power supply control unit for controlling the state of power supply in the physical device(s); and
a host computer including an assigned storage region assigned from the storage subsystem, a monitor for acquiring information for management of the assigned storage region, and a power supply control indication unit for ordering the power supply control unit to change the power supply state in the physical device(s) to 'on' or another state,
wherein the host computer has a storage region information table that stores first information indicating the power supply state, including whether or not the power supply state in the storage region is 'on,' and second information detailing a usage measurement concerning the storage region, and
wherein the monitor acquires, when acquiring the information for management of the storage region, the second information detailing a usage measurement from the storage region if the power supply state in the storage region is 'on,' or acquires the second information stored in the storage region information table if the power supply state in the storage region is not 'on'.

10. The storage system according to claim 9, wherein the power supply control indication unit orders, after executing I/O access to the storage region to acquire the second information and storing the second information in the storage region information table, the power supply control unit to set the power supply state in the storage region to a state other than 'on,' and the power supply control unit sets the power supply state in the storage region to a state other than 'on' based on the order.

11. The storage system according to claim 9, wherein before the power supply control unit sets the power supply state in the storage region to a state other than 'on,' the notification unit executes I/O access to the storage region to acquire the second information and stores the second information in the storage region information table after the notification is given to the host computer, and the power supply control unit sets the power supply state in the storage region to a state other than 'on' based on the order.

12. The storage system according to claim 9, wherein the second information detailing a usage measurement concerning the storage region, is more particularly usage rate information, and wherein the second information stored in the storage region information table is more particularly most-recently-stored usage rate information.

13. A method for acquiring management information for power saving in a storage system including: a storage subsystem including one or more physical device(s), a storage region composed of at least a portion of the one or more physical device(s), and a power supply control unit for controlling the state of power supply in the physical device(s); a host computer including an assigned region assigned from the storage subsystem, and a monitor for acquiring information for management of the assigned storage region; and a management computer including a power supply control indication unit for ordering the power supply control unit to change the power supply state in the physical device(s) to 'on' or another state, and a notification unit for notifying the host computer of the change of the power supply state in the physical device(s),
the method comprising:
checking, under the control of the monitor, whether or not the power supply state in the storage region is 'on' when acquiring information for management of the storage region, based on a storage region information table that stores first information indicating whether or not the power supply state in the storage region is 'on' and second information detailing a usage measurement concerning the storage region; and
acquiring the second information detailing a usage measurement from the storage region if the power supply state in the storage region is 'on,' or acquiring the second information stored in the storage region information table if the power supply state in the storage region is not 'on'.

14. The management information acquisition method for power saving in a storage system according to claim 13, wherein the information concerning the storage region is a file system usage rate.

15. The management information acquisition method for power saving in a storage subsystem according to claim 13, wherein if the power supply state is not 'on,' the power supply state is 'off' or in 'suspended' mode.

16. The management information acquisition method for power saving in a storage system according to claim 13, wherein the monitor requests, after executing I/O access to the power supply control indication to acquire the second information and stores the second information in the storage region information table, that the power supply control indication unit set the power supply state in the storage region to a state other than 'on' based on the request.

17. The management information acquisition method for power saving in a storage system according to claim 13, wherein the notification unit notifies the monitor of the order before the power supply control unit indication unit orders the power supply control unit to set the power supply state in the storage region to a state other than 'on,' and the monitor stores, after receiving the notification, executes I/O access to the storage region to acquire the second information and stores the second information in the storage region information table.

18. The management information acquisition method for power saving in a storage system according to claim 13, wherein the storage subsystem includes a notification delegating unit for requesting notification to the host computer of the change of the power supply state in the storage region, the notification delegating unit requests, before the power supply control unit sets the power supply state in the storage region to a state other than 'on,' that the notification unit notify the host computer of the setting, and the monitor executes I/O access to the storage region to acquire the second information and stores the second information in the storage region information table.

19. The management information acquisition method for power saving in a storage system according to claim 13, wherein the second information detailing a usage measurement concerning the storage region, is more particularly usage rate information, and wherein the second information stored in the storage region information table is more particularly most-recently-stored usage rate information.

20. A method for acquiring management information for power saving in a storage system in a storage system including: a storage subsystem including one or more physical device(s), a storage region composed of at least a portion of the one or more physical device(s), and a power supply control unit for controlling the state of power supply in the physical device(s); a host computer including an assigned region assigned from the storage subsystem, and a monitor for acquiring information for management of the assigned storage region; and a management computer including a power supply control indication unit for ordering the power supply control unit to change the power supply state in the physical device(s) to 'on' or another state, and a notification unit for notifying the host computer of the change of the power supply state in the physical device(s), the method comprising:

checking, under the control of the monitor, whether or not the power supply state in the storage region is 'on' when acquiring information for management of the storage region, based on a storage region information table that stores first information indicating whether or not the power supply state in the storage region is 'on' and second information concerning the storage region;

acquiring the second information from the storage region if the power supply state in the storage region is 'on,' or acquiring the second information stored in the storage region information table if the power supply state in the storage region is not 'on'; and wherein the storage region information table contains not only the power supply state in the storage region but also the power supply state in a control unit for controlling the storage region.

21. A method for acquiring management information for power saving in a storage system including: a storage subsystem including one or more physical device(s), a storage region composed of at least a portion of the physical device(s), and a power supply control unit for controlling the state of power supply in the physical device(s); and a host computer including an assigned storage region assigned from the storage subsystem, a monitor for acquiring information for management of the assigned storage region, and a power supply control indication unit for ordering the power supply control unit to change the power supply state in the physical device(s) to 'on' or another state, the method comprising:

checking, under the control of the monitor, whether or not the power supply state in the storage region is 'on' when acquiring information for management of the storage region, based on a storage region information table that stores first information indicating the power supply state, including whether or not the power supply state in the storage region is 'on,' and second information detailing a usage measurement concerning the storage region; and acquiring the second information detailing a usage measurement from the storage region if the power supply state in the storage region is 'on,' or acquiring the second information stored in the storage region information table if the power supply state in the storage region is not 'on'.

22. The management information acquisition method for power saving in a storage system according to claim 21, wherein the power supply control indication unit orders the power supply control unit to set the power supply state to a state other than 'on' after performing I/O access to the storage region to acquire the second information and storing the second information in the storage region information table, and the power supply control unit sets the power supply state in the storage region to a state other than 'on' based on the order.

23. The management information acquisition method for power saving in a storage system according to claim 21, wherein the indication unit performs I/O access to the storage region to acquire the second information after notifying the host computer and before the power supply control unit sets the power supply state in the storage region to a state other than 'on,' and the power supply control unit sets the power supply state in the storage region to a state other than 'on'.

24. The management information acquisition method for power saving in a storage system according to claim 21, wherein the second information detailing a usage measurement concerning the storage region, is more particularly usage rate information, and wherein the second information stored in the storage region information table is more particularly most-recently-stored usage rate information.

* * * * *